US008971622B2

(12) United States Patent
Kano

(10) Patent No.: US 8,971,622 B2
(45) Date of Patent: Mar. 3, 2015

(54) IMAGE PROCESSING APPARATUS, IMAGE CAPTURE APPARATUS, AND IMAGE PROCESSING METHOD

(75) Inventor: Akira Kano, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 247 days.

(21) Appl. No.: 13/591,609

(22) Filed: Aug. 22, 2012

(65) Prior Publication Data

US 2013/0050544 A1 Feb. 28, 2013

(30) Foreign Application Priority Data

Aug. 31, 2011 (JP) ................................ 2011-189326

(51) Int. Cl.

*G06K 9/00* (2006.01)
*G06K 9/32* (2006.01)
*H04N 9/64* (2006.01)
*H04N 9/04* (2006.01)

(52) U.S. Cl.

CPC .......... *H04N 9/045* (2013.01); *H04N 2209/046* (2013.01)
USPC ............................ 382/167; 382/300; 348/242

(58) Field of Classification Search

USPC .................................. 382/167, 300; 348/242
See application file for complete search history.

(56) References Cited

U.S. PATENT DOCUMENTS 4,663,655 A * 5/1987 Freeman ....................... 348/242
4,774,565 A * 9/1988 Freeman ....................... 348/242
7,053,908 B2 * 5/2006 Saquib et al. ................. 345/589
7,768,567 B2 8/2010 Azuma
8,565,555 B2 10/2013 Kotani
8,605,163 B2 12/2013 Hatakeyama
2009/0189997 A1 7/2009 Stec et al.

(Continued)

FOREIGN PATENT DOCUMENTS

CN 101500077 A 8/2009
CN 101527858 A 9/2009

(Continued)

OTHER PUBLICATIONS

The above (US Patent Documents 1-2; and patent literature document 1) were cited in a Mar. 20, 2013 European Search Report which is enclosed of the European Patent Application No. 12182461.9, which is a counterpart application of the related U.S. Appl. No. 13/591,609.

(Continued)

*Primary Examiner* — Kanjibhai Patel
(74) *Attorney, Agent, or Firm* — Cowan, Liebowitz & Latman, P.C.

(57) ABSTRACT

An image processing apparatus and image processing method, which enable suppression of coloring that occurs in image recovery processing for a RAW image are disclosed. Pixel interpolation processing is executed for a predetermined reference color component of the RAW image. For each color component other than the reference color component, a first color difference is obtained using a pixel value of the color component and a corresponding pixel value of the reference color component after the pixel interpolation processing. After applying the image recovery processing to each color component, a second color difference is obtained in a similar manner to the first color difference, and a pixel value is corrected according to the difference between the first and second color differences determined before and after the image recovery processing.

12 Claims, 21 Drawing Sheets

101a
101
101b
102
IMAGE SENSOR
103
A/D
104
111
IMAGE PROCESSING UNIT
112
IMAGE RECOVERY PROCESSING UNIT
ANOTHER IMAGE PROCESSING UNIT
105
DISPLAY UNIT
106
OPTICAL IMAGING SYSTEM CONTROL UNIT
107
STATE DETECTION UNIT
108
STORAGE UNIT
109
IMAGE RECORDING MEDIUM
110
SYSTEM CONTROLLER

(56) References Cited

U.S. PATENT DOCUMENTS

| | | | | |
|---|---|---|---|---|
| 2010/0079615 | A1* | 4/2010 | Hatakeyama | 348/223.1 |
| 2010/0103284 | A1 | 4/2010 | Sugimori | |

FOREIGN PATENT DOCUMENTS

| | | | |
|---|---|---|---|
| EP | 2083388 | A2 | 7/2009 |
| EP | 2099229 | A1 | 9/2009 |
| JP | 10-165365 | A | 6/1998 |
| JP | 3532368 | | 5/2004 |

OTHER PUBLICATIONS

U.S. Appl. No. 13/591,467, filed Aug. 22, 2012, Akira Kano.

Chinese Office Action that issued in Chinese Patent Application No. 201210320880.1, which is a counterpart application of the subject case, namely U.S. Appl. No. 13/591,467.

The above (Foreign Patent Documents 1-3) were cited in a Mar. 13, 2013 European Search Report which is enclosed of the counterpart European Patent Application No. 12182462.7.

The above patent documents were cited in a Jul. 2, 2014 U.S. Office Action, that issued in related U.S. Appl. No. 13/591,467.

Using Adobe Photoshop CS4, Mar. 2, 2011, p. 1, 81, 101, 189, XP055056364.Retrived from the Internet: URL: http: // www.4shared.com/office/yZw82i4f / PhotoShop_CS4_Help.html1.

The above were cited in a Mar. 20, 2013 European Search Report of the counterpart European Patent Application No. 12182461.9.

Using Adobe Photoshop CS4, Mar. 2, 2011, p. 1, 81, 101, 119, 214, 353, 354, 355, 356, 357, 358, XP055055442. Retrived from the Internet: URL:http: // www.4shared.com/office/yZw82i4f / PhotoShop_CS4_Help.html1.

The above were cited in a Mar. 13, 2013 European Search Report of the European Patent Application No. 12182462.7, which is a counterpart application of the related U.S. Appl. No. 13/591,467.

* cited by examiner

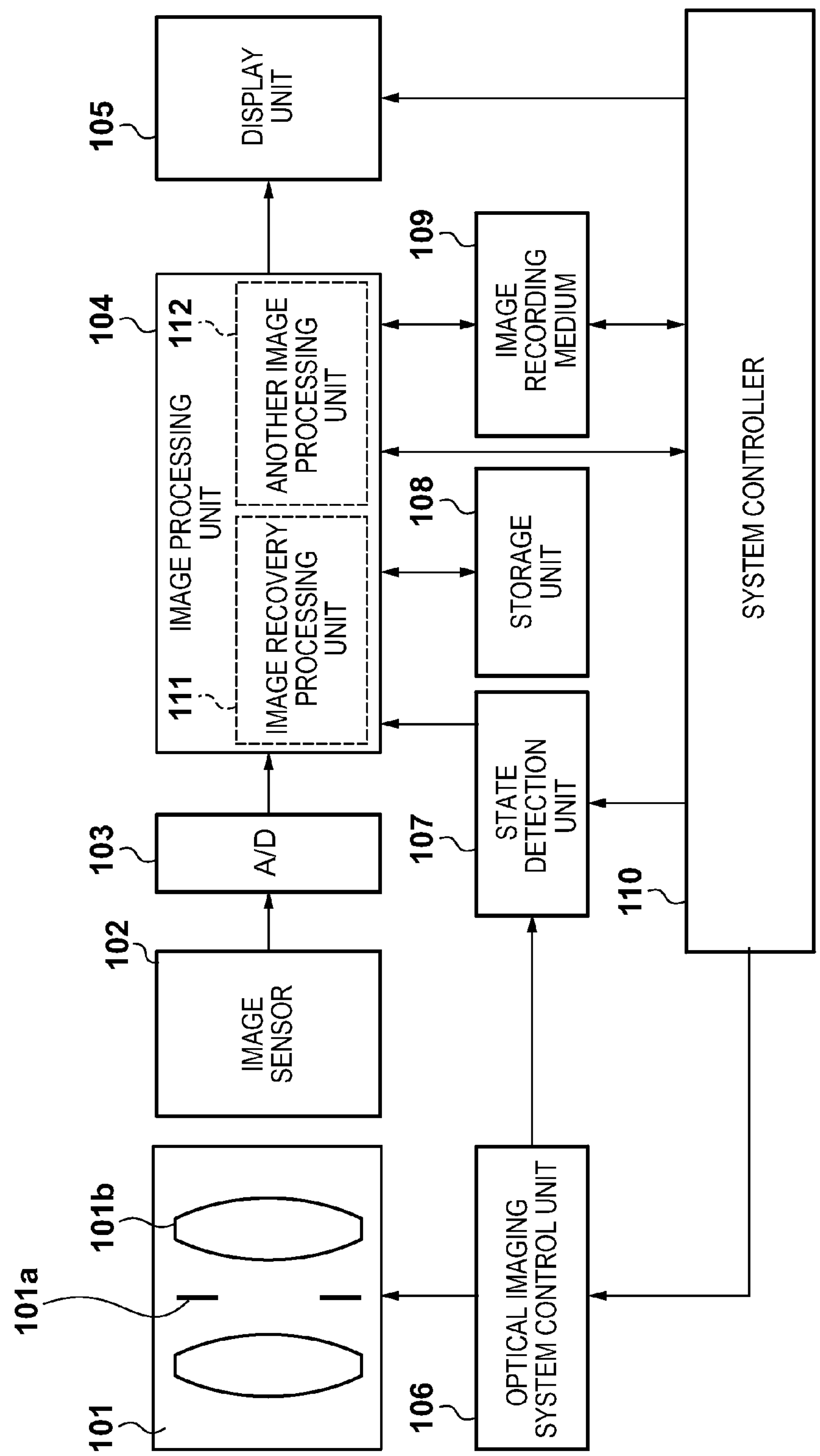
F I G. 1
101
101a
101b
102
IMAGE SENSOR
103
A/D
104
IMAGE PROCESSING UNIT
111
IMAGE RECOVERY PROCESSING UNIT
112
ANOTHER IMAGE PROCESSING UNIT
105
DISPLAY UNIT
106
OPTICAL IMAGING SYSTEM CONTROL UNIT
107
STATE DETECTION UNIT
108
STORAGE UNIT
109
IMAGE RECORDING MEDIUM
110
SYSTEM CONTROLLER

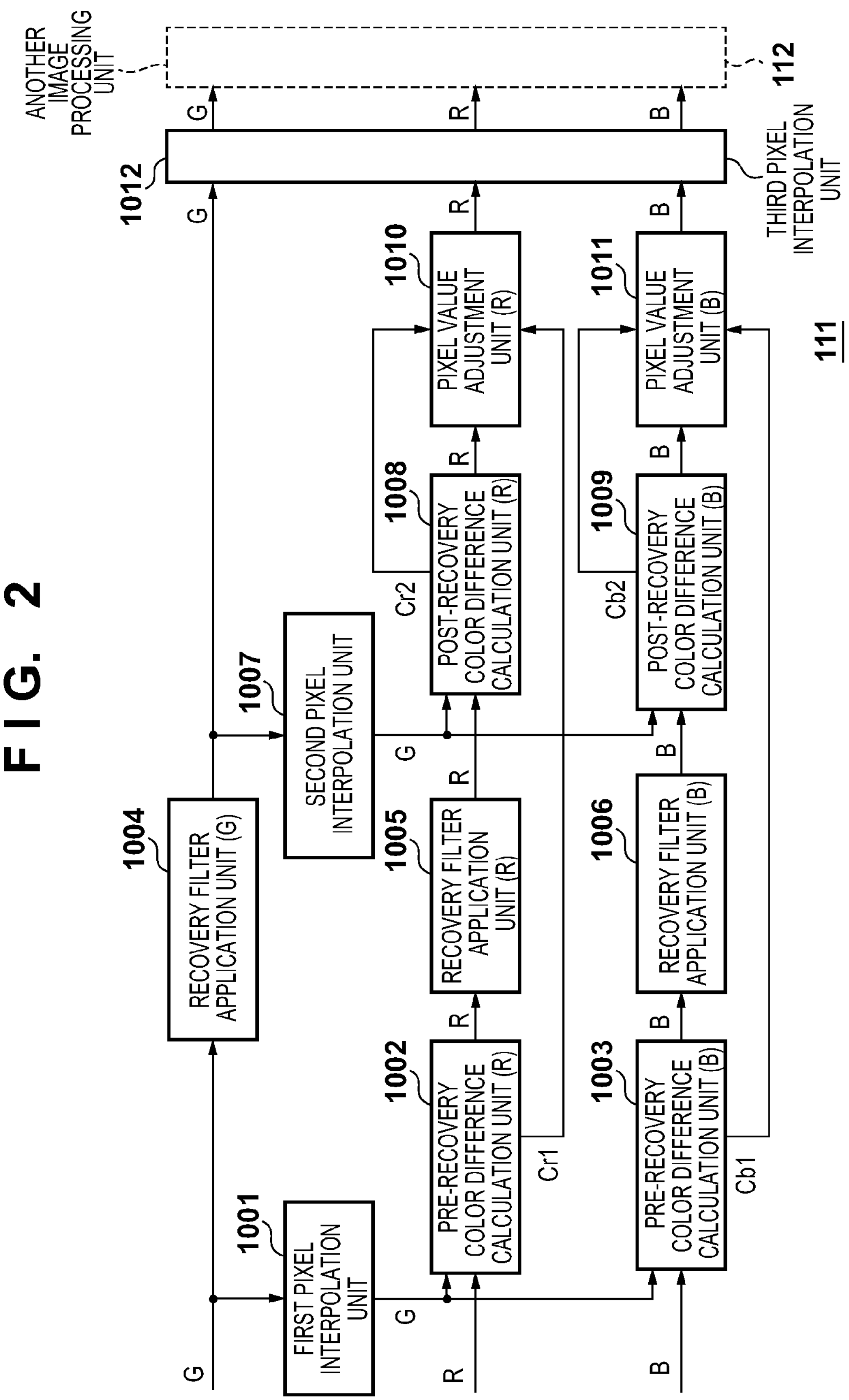
F I G. 2
G
R
B
1001
FIRST PIXEL INTERPOLATION UNIT
G
1002
PRE-RECOVERY COLOR DIFFERENCE CALCULATION UNIT (R)
Cr1
1003
PRE-RECOVERY COLOR DIFFERENCE CALCULATION UNIT (B)
Cb1
1004
RECOVERY FILTER APPLICATION UNIT (G)
1005
RECOVERY FILTER APPLICATION UNIT (R)
1006
RECOVERY FILTER APPLICATION UNIT (B)
1007
SECOND PIXEL INTERPOLATION UNIT
1008
POST-RECOVERY COLOR DIFFERENCE CALCULATION UNIT (R)
Cr2
1009
POST-RECOVERY COLOR DIFFERENCE CALCULATION UNIT (B)
Cb2
1010
PIXEL VALUE ADJUSTMENT UNIT (R)
1011
PIXEL VALUE ADJUSTMENT UNIT (B)
1012
THIRD PIXEL INTERPOLATION UNIT
ANOTHER IMAGE PROCESSING UNIT
112
111

FIG. 4A

| | | | | | |
|---|---|---|---|---|---|
| R | G | R | G | R | G |
| G | B | G | B | G | B |
| R | G | R | G | R | G |
| G | B | G | B | G | B |
| R | G | R | G | R | G |
| G | B | G | B | G | B |

FIG. 4B

| | | | | | |
|---|---|---|---|---|---|
| | G | | G | | G |
| G | | G | | G | |
| | G | | G | | G |
| G | | G | | G | |
| | G | | G | | G |
| G | | G | | G | |

FIG. 4C

| | | | | | |
|---|---|---|---|---|---|
| R | | R | | R | |
| | | | | | |
| R | | R | | R | |
| | | | | | |
| R | | R | | R | |
| | | | | | |

FIG. 4D

| | | | | | |
|---|---|---|---|---|---|
| | | | | | |
| | B | | B | | B |
| | | | | | |
| | B | | B | | B |
| | | | | | |
| | B | | B | | B |

FIG. 4E

| | | | | | |
|---|---|---|---|---|---|
| G | G | G | G | G | G |
| G | G | G | G | G | G |
| G | G | G | G | G | G |
| G | G | G | G | G | G |
| G | G | G | G | G | G |
| G | G | G | G | G | G |

| | | | | |
|---|---|---|---|---|
| 100 | 100 | 100 | 200 | 200 |
| 100 | 100 | 100 | 200 | 200 |
| 100 | 100 | 100 | 200 | 200 |
| 100 | 100 | 100 | 200 | 200 |
| 100 | 100 | 100 | 200 | 200 |

| | 0 | 1 | 2 | 3 | 4 |
|---|---|---|---|---|---|
| 0 | 100 | | 100 | | 200 |
| 1 | | 100 | | 200 | |
| 2 | 100 | | 100 | | 200 |
| 3 | | 100 | | 200 | |
| 4 | 100 | | 100 | | 200 |

G BEFORE INTERPOLATION

| | 0 | 1 | 2 | 3 | 4 |
|---|---|---|---|---|---|
| 0 | | 100 | | 200 | |
| 1 | | | | | |
| 2 | | 100 | | 200 | |
| 3 | | | | | |
| 4 | | 100 | | 200 | |

R BEFORE INTERPOLATION

| | 0 | 1 | 2 | 3 | 4 |
|---|---|---|---|---|---|
| 0 | | | | | |
| 1 | 100 | | 100 | | 200 |
| 2 | | | | | |
| 3 | 100 | | 100 | | 200 |
| 4 | | | | | |

B BEFORE INTERPOLATION

FIG. 5F

| 100 | 100 | 100 | 175 | 200 |
|---|---|---|---|---|
| 100 | 100 | 125 | 200 | 200 |
| 100 | 100 | 100 | 175 | 200 |
| 100 | 100 | 125 | 200 | 200 |
| 100 | 100 | 100 | 175 | 200 |

G AFTER LINEAR INTERPOLATION

FIG. 5G

| 100 | 100 | 150 | 200 | 200 |
|---|---|---|---|---|
| 100 | 100 | 150 | 200 | 200 |
| 100 | 100 | 150 | 200 | 200 |
| 100 | 100 | 150 | 200 | 200 |
| 100 | 100 | 150 | 200 | 200 |

R AFTER LINEAR INTERPOLATION

FIG. 5H

| 100 | 100 | 100 | 150 | 200 |
|---|---|---|---|---|
| 100 | 100 | 100 | 150 | 200 |
| 100 | 100 | 100 | 150 | 200 |
| 100 | 100 | 100 | 150 | 200 |
| 100 | 100 | 100 | 150 | 200 |

B AFTER LINEAR INTERPOLATION

FIG. 5I

| 100 | 100 | 100 | 200 | 200 |
|---|---|---|---|---|
| 100 | 100 | 100 | 200 | 200 |
| 100 | 100 | 100 | 200 | 200 |
| 100 | 100 | 100 | 200 | 200 |
| 100 | 100 | 100 | 200 | 200 |

G AFTER ADAPTIVE INTERPOLATION

FIG. 5J

| 100 | 100 | 100 | 200 | 200 |
|---|---|---|---|---|
| 100 | 100 | 100 | 200 | 200 |
| 100 | 100 | 100 | 200 | 200 |
| 100 | 100 | 100 | 200 | 200 |
| 100 | 100 | 100 | 200 | 200 |

R AFTER ADAPTIVE INTERPOLATION

FIG. 5K

| 100 | 100 | 100 | 200 | 200 |
|---|---|---|---|---|
| 100 | 100 | 100 | 200 | 200 |
| 100 | 100 | 100 | 200 | 200 |
| 100 | 100 | 100 | 200 | 200 |
| 100 | 100 | 100 | 200 | 200 |

B AFTER ADAPTIVE INTERPOLATION

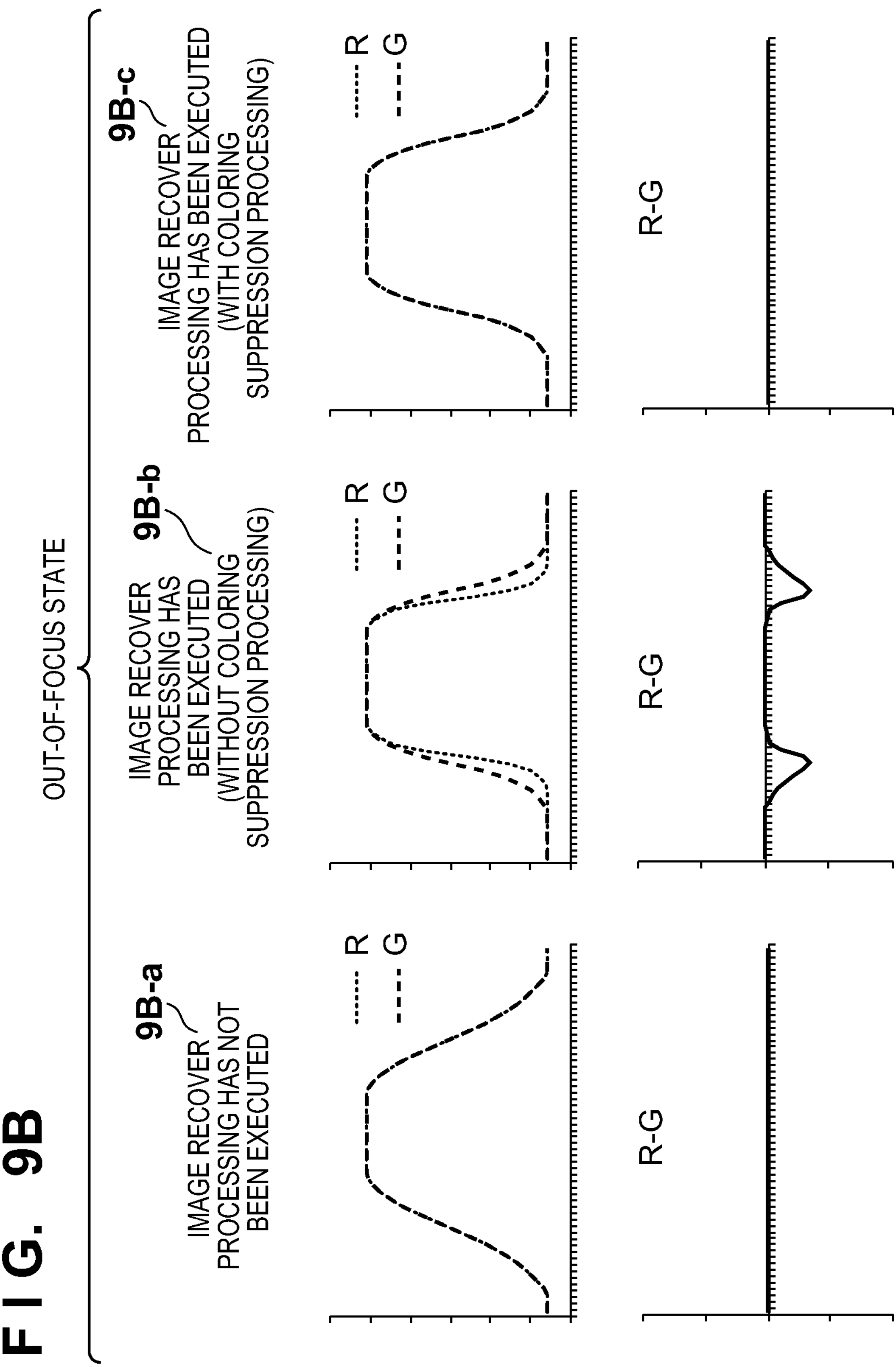
F I G. 9B
OUT-OF-FOCUS STATE
9B-a
IMAGE RECOVER PROCESSING HAS NOT BEEN EXECUTED
R
G
R-G
9B-b
IMAGE RECOVER PROCESSING HAS BEEN EXECUTED (WITHOUT COLORING SUPPRESSION PROCESSING)
R
G
R-G
9B-c
IMAGE RECOVER PROCESSING HAS BEEN EXECUTED (WITH COLORING SUPPRESSION PROCESSING)
R
G
R-G

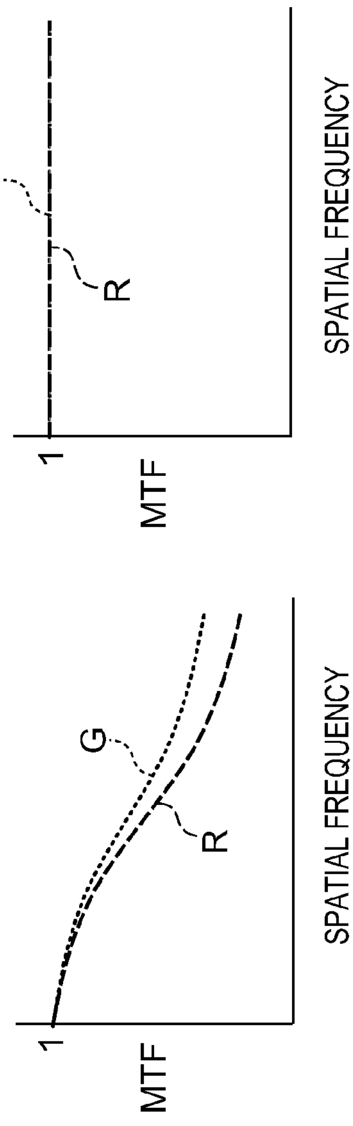
FIG. 10A
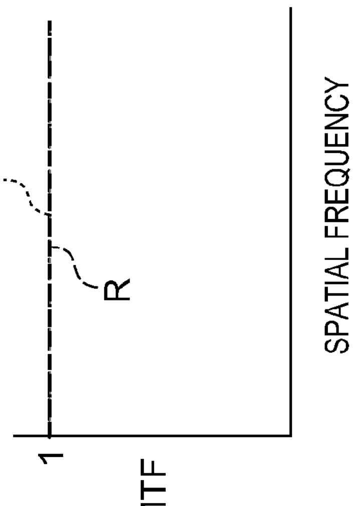
FIG. 10B
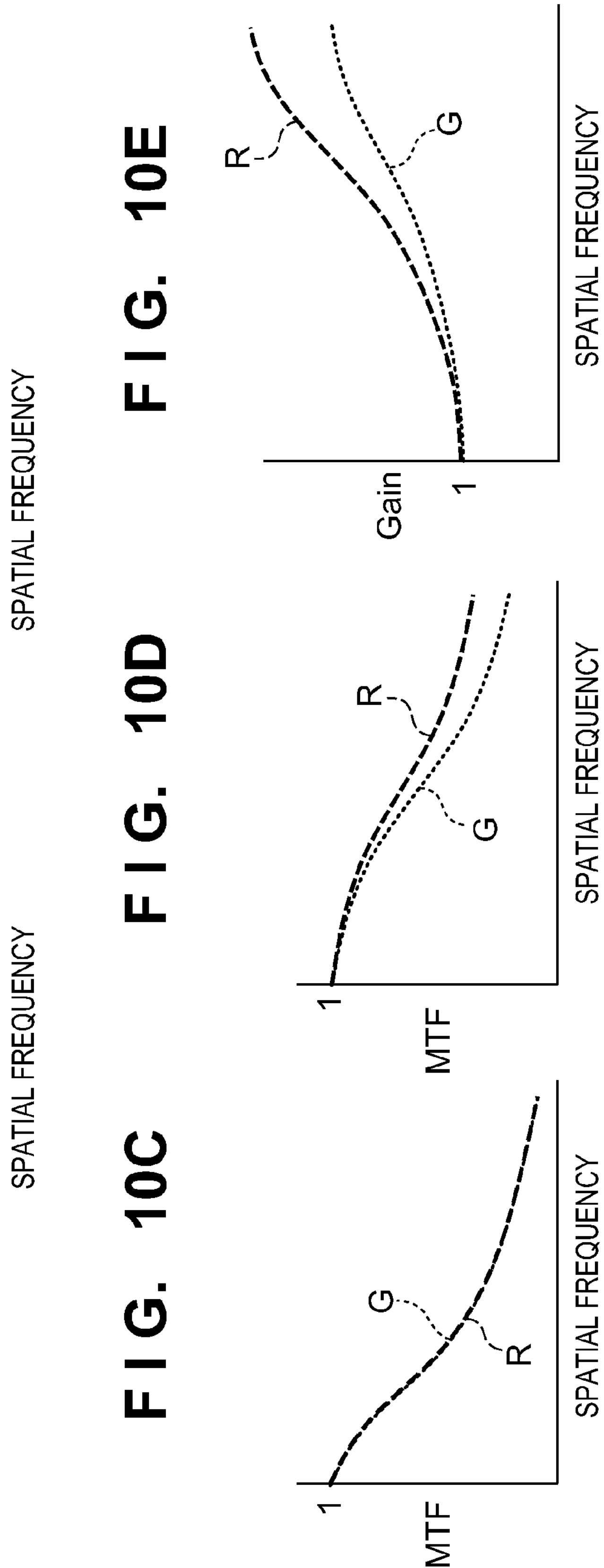
FIG. 10C
FIG. 10D
FIG. 10E

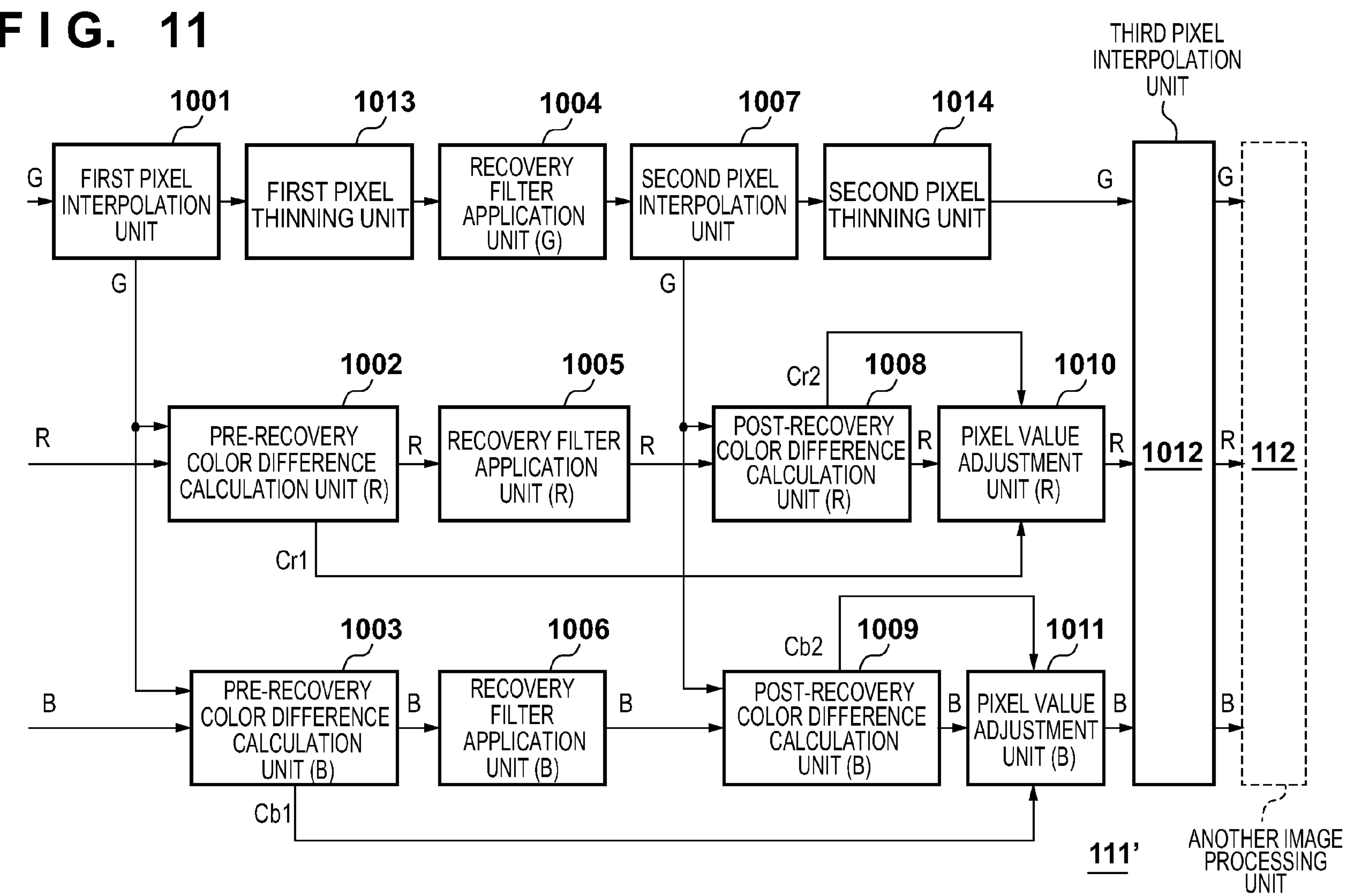
FIG. 11
1001
FIRST PIXEL INTERPOLATION UNIT
1013
FIRST PIXEL THINNING UNIT
1004
RECOVERY FILTER APPLICATION UNIT (G)
1007
SECOND PIXEL INTERPOLATION UNIT
1014
SECOND PIXEL THINNING UNIT
THIRD PIXEL INTERPOLATION UNIT
1012
112
ANOTHER IMAGE PROCESSING UNIT
1002
PRE-RECOVERY COLOR DIFFERENCE CALCULATION UNIT (R)
1005
RECOVERY FILTER APPLICATION UNIT (R)
1008
POST-RECOVERY COLOR DIFFERENCE CALCULATION UNIT (R)
1010
PIXEL VALUE ADJUSTMENT UNIT (R)
1003
PRE-RECOVERY COLOR DIFFERENCE CALCULATION UNIT (B)
1006
RECOVERY FILTER APPLICATION UNIT (B)
1009
POST-RECOVERY COLOR DIFFERENCE CALCULATION UNIT (B)
1011
PIXEL VALUE ADJUSTMENT UNIT (B)
111'
G
R
B
Cr1
Cr2
Cb1
Cb2

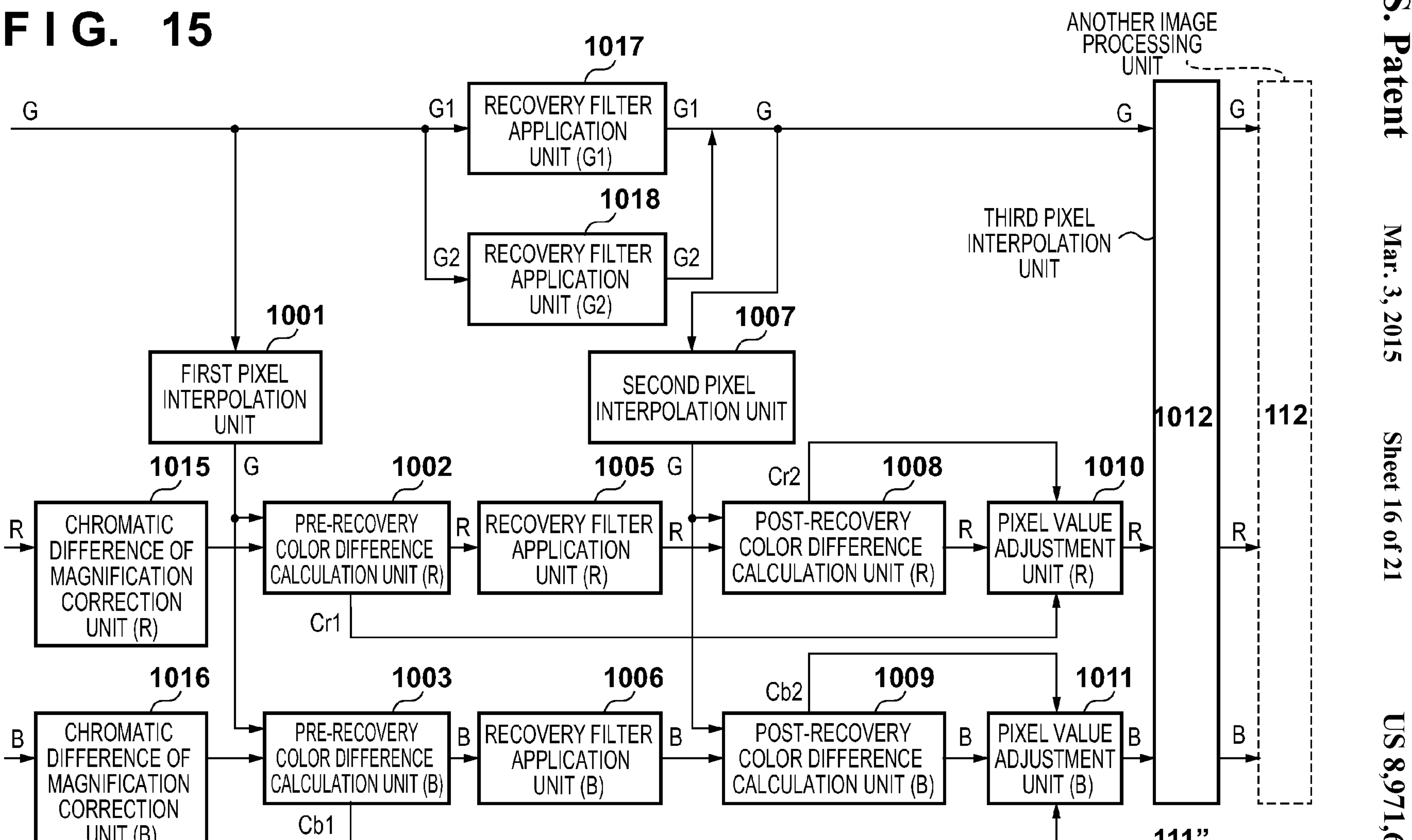
F I G. 15
G
G1
G2
R
B
1017
RECOVERY FILTER APPLICATION UNIT (G1)
1018
RECOVERY FILTER APPLICATION UNIT (G2)
1001
FIRST PIXEL INTERPOLATION UNIT
1007
SECOND PIXEL INTERPOLATION UNIT
1015
CHROMATIC DIFFERENCE OF MAGNIFICATION CORRECTION UNIT (R)
1002
PRE-RECOVERY COLOR DIFFERENCE CALCULATION UNIT (R)
1005
RECOVERY FILTER APPLICATION UNIT (R)
1008
POST-RECOVERY COLOR DIFFERENCE CALCULATION UNIT (R)
1010
PIXEL VALUE ADJUSTMENT UNIT (R)
Cr1
Cr2
1016
CHROMATIC DIFFERENCE OF MAGNIFICATION CORRECTION UNIT (B)
1003
PRE-RECOVERY COLOR DIFFERENCE CALCULATION UNIT (B)
1006
RECOVERY FILTER APPLICATION UNIT (B)
1009
POST-RECOVERY COLOR DIFFERENCE CALCULATION UNIT (B)
1011
PIXEL VALUE ADJUSTMENT UNIT (B)
Cb1
Cb2
ANOTHER IMAGE PROCESSING UNIT
THIRD PIXEL INTERPOLATION UNIT
1012
112
111"

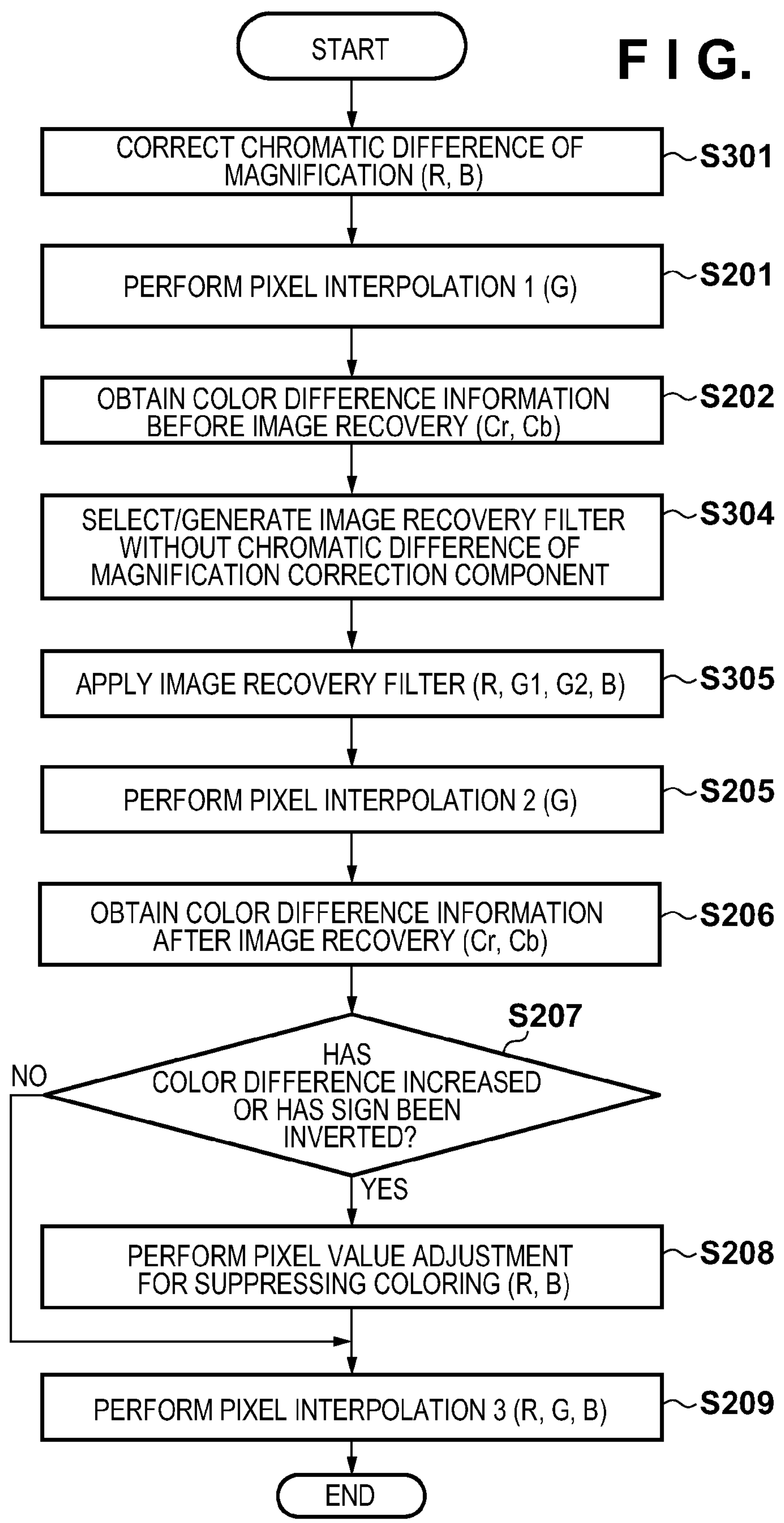
F I G. 16

FREQUENCY CHARACTERISTICS OF G (G1 + G2)

FREQUENCY CHARACTERISTICS OF R, B, G1, AND G2

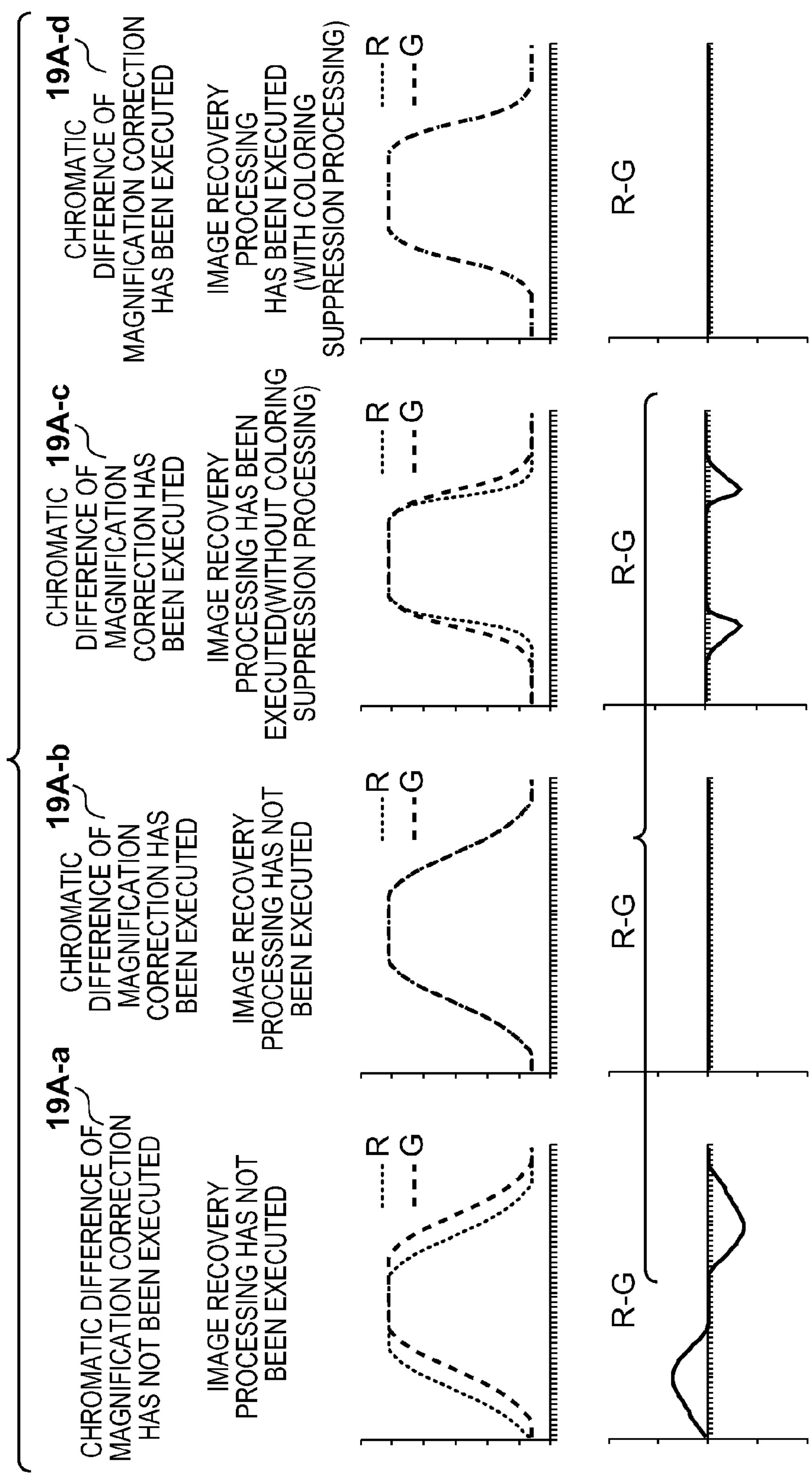
FIG. 19A
19A-a
CHROMATIC DIFFERENCE OF MAGNIFICATION CORRECTION HAS NOT BEEN EXECUTED
IMAGE RECOVERY PROCESSING HAS NOT BEEN EXECUTED
19A-b
CHROMATIC DIFFERENCE OF MAGNIFICATION CORRECTION HAS BEEN EXECUTED
IMAGE RECOVERY PROCESSING HAS NOT BEEN EXECUTED
19A-c
CHROMATIC DIFFERENCE OF MAGNIFICATION CORRECTION HAS BEEN EXECUTED
IMAGE RECOVERY PROCESSING HAS BEEN EXECUTED(WITHOUT COLORING SUPPRESSION PROCESSING)
19A-d
CHROMATIC DIFFERENCE OF MAGNIFICATION CORRECTION HAS BEEN EXECUTED
IMAGE RECOVERY PROCESSING HAS BEEN EXECUTED (WITH COLORING SUPPRESSION PROCESSING)
R
G
R-G
IN CASE THAT IMAGE RECOVERY FILTER WITHOUT CHROMATIC DIFFERENCE OF MAGNIFICATION CORRECTION COMPONENT IS USED

FIG. 19B 19B-a

CHROMATIC DIFFERENCE OF MAGNIFICATION CORRECTION HAS NOT BEEN EXECUTED

IMAGE RECOVERY PROCESSING HAS NOT BEEN EXECUTED

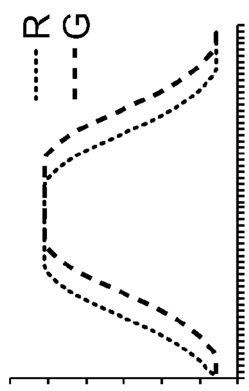

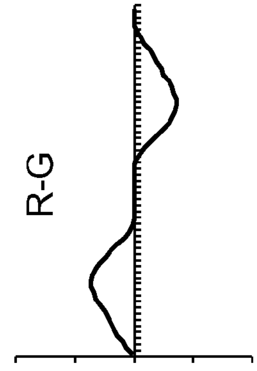

19B-b

IMAGE RECOVERY PROCESSING HAS BEEN EXECUTED (WITHOUT COLORING SUPPRESSION PROCESSING)

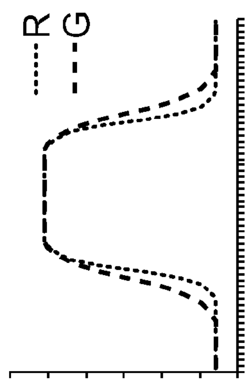

19B-c

IMAGE RECOVERY PROCESSING HAS BEEN EXECUTED (WITH COLORING SUPPRESSION PROCESSING)

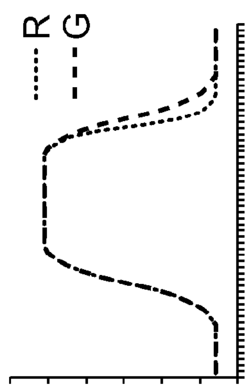

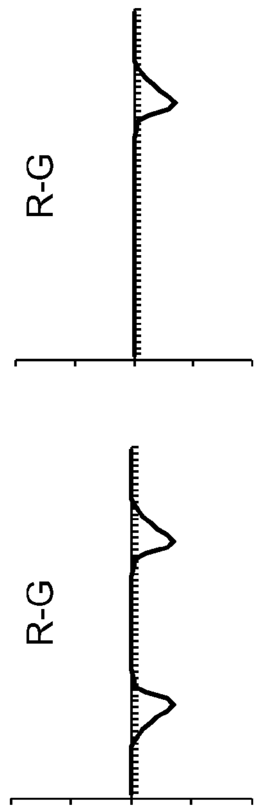

IN CASE THAT IMAGE RECOVERY FILTER WITH CHROMATIC DIFFERENCE OF MAGNIFICATION CORRECTION COMPONENT IS USED

IMAGE PROCESSING APPARATUS, IMAGE CAPTURE APPARATUS, AND IMAGE PROCESSING METHOD

BACKGROUND OF THE INVENTION

1. Field of the Invention

The present invention relates to an image processing apparatus, image capture apparatus, and an image processing method, and more particularly, to an image correction technique using image recovery processing.

2. Description of the Related Art

The image quality of an image obtained by capturing an object by an image capture apparatus degrades especially due to the aberrations of an optical imaging system. For example, blur of an image indicates degradation in image quality due to the spherical aberration, coma aberration, curvature of field, astigmatism, and the like of the optical imaging system. By ignoring an influence of diffraction as the characteristic of a light wave, light beams coming from one point of the object converge to one point (focal point) of the same size on an imaging plane by an optical imaging system without aberrations. The focal point, however, actually spreads due to the aberrations of the optical imaging system in addition to the influence of diffraction.

The point spread function (PSF) of the optical imaging system represents an intensity distribution around the focal point, that is, blur of the image due to diffraction and the aberrations of the optical imaging system, which is, therefore, referred to as a blur component. The blur component indicates not blur due to an out-of-focus state but blur caused by the diffraction of light and the aberrations of the optical imaging system even in an in-focus state.

Color fringing, in a color image, due to the axial chromatic aberration, color spherical aberration, and color coma aberration of the optical imaging system may be caused by a variation in degree of blur depending on the wavelength of light. A color deviation in the lateral direction due to the chromatic difference of magnification of an optical system may indicate misregistration or a phase shift due to a variation in imaging magnification depending on the wavelength of light.

An optical transfer function (OTF) obtained by performing a Fourier transform for the point spread function (PSF) serves as frequency component information of the aberrations, and is represented by a complex number. The absolute value of the optical transfer function (OTF), that is the amplitude component, will be referred to as an MTF (Modulation Transfer Function), and the phase component will be referred to as a PTF (Phase Transfer Function). The MTF and PTF are the frequency characteristics of the amplitude and phase components of image degradation due to the aberrations. The phase component PTF is represented as a phase angle by:

$$\mathrm{PTF}=\tan^{-1}(Im(\mathrm{OTF})/Re(\mathrm{OTF})) \quad (1)$$

where Re(OTF) and Im(OTF) represent the real part and imaginary part of the optical transfer function, respectively.

As described above, since the optical transfer function of the optical imaging system degrades both the amplitude component and phase component of the image, respective points of an object image are blurred asymmetrically with respect to the focal point, similarly to a case in which a coma aberration occurs.

The chromatic difference of magnification indicates a phenomenon in which an imaging position shifts due to a variation in imaging magnification depending on the wavelength of light. An image sensor is generally provided with a RGB color mosaic filter, and each pixel is configured to obtain one of R, G, and B color components. In addition to misregistration of an imaging position between R, G, and B wavelengths, misregistration of an imaging position for each wavelength, that is, spread of an image due to a phase shift occurs within each obtained color component. Although the chromatic difference of magnification does not exactly indicate a color deviation due to a simple parallel shift, the color deviation and chromatic difference of magnification are used as synonyms in this specification unless otherwise specified.

There is known a method, called an image recovery method or image restoration method, of correcting degradation in the amplitude component (MTF) and the phase component (PTF) using information of the optical transfer function of an optical imaging system. Processing for correcting degradation in an image using information of the optical transfer function of an optical imaging system, therefore, will be referred to as image recovery processing hereinafter.

An overview of the image recovery processing will now be described. Let g(x, y) be a degraded image, f(x, y) be an original image, and h(x, y) be a point spread function obtained by performing inverse Fourier transform for the optical transfer function of the optical imaging system. Then, $$g(x,y)=h(x,y)*f(x,y) \quad (2)$$

where an operator "*" represents convolution and (x, y) represents coordinates on the image.

Fourier transform is performed for equation (2) to obtain a display format on a two-dimensional frequency plane, resulting in the format of a product for each frequency, as represented by:

$$G(u,v)=H(u,v)\cdot F(u,v) \quad (3)$$

where H represents an optical transfer function obtained by performing Fourier transform for the point spread function, and (u, v) represents coordinates on the two-dimensional frequency plane, that is, a frequency.

To obtain the original image from the captured degraded image, it is only necessary to divide both sides of equation (3) by H, as represented by:

$$G(u,v)/H(u,v)=F(u,v) \quad (4)$$

The original image f(x, y) is obtained as a recovered image by performing inverse Fourier transform for F(u, v) to return to the real plane.

Let R be 1/H in above equation having undergone inverse Fourier transform. It is then possible to obtain the original image by executing convolution processing for the image on the real plane, as indicated by:

$$g(x,y)*R(x,y)=f(x,y) \quad (5)$$

R(x, y) will be referred to as an image recovery filter. An image recovery filter to be applied to a two-dimensional image is generally a two-dimensional filter having a tap (cell) corresponding to each pixel of the image. Furthermore, as the number of taps (cells) of the image recovery filter increases, the recovery accuracy generally improves. The actual number of taps is set according to the required image quality, the image processing capability, the aberration characteristics, and the like. Since the image recovery filter is based on the optical transfer function which reflects the aberration characteristics of the optical imaging system, degradation in frequency component and phase component can be corrected with high accuracy. Such an image recovery filter is fundamentally different from a two-dimensional filter like an edge enhancement filter (high-pass filter) having three taps in each of the horizontal and vertical directions.

For example, Japanese Patent No. 3532368 discloses a method of canceling blur of an image in a portion, other than an in-focus range, of an image captured by a fluorescence endoscope for observing an inside of a living body, using a point spread function according to a fluorescence wavelength to be used.

Note that since an actual image includes a noise component, using an image recovery filter created by obtaining the complete reciprocal of the optical transfer function amplifies the noise component, thereby disabling to obtain a high-quality recovered image. The image recovery filter created by obtaining the complete reciprocal of the optical transfer function recovers degradation in amplitude by the optical imaging system by correcting (increasing) the MTF of the optical imaging system so that the MTF becomes 1 for all frequencies. If the amplitude component of the image has been added with the amplitude of noise, the power spectrum of the noise increases as the MTF increases, thereby undesirably amplifying the noise according to the recovery degree (recovery gain) of the MTF.

There is a well known method of suppressing noise in a recovered image using an image recovery filter for suppressing the recovery ratio on the high frequency side of the image according to a strength ratio between an image signal and a noise signal, like a Wiener filter. Degradation of a color fringing component of an image can be corrected by, for example, correcting a blur component so that the amounts of blur for respective color components of the image are uniform. Note that since an optical transfer function changes depending on a captured state such as the zoom position or the diameter of the aperture stop of the optical imaging system, it is possible to implement high-precision image recovery processing using an image recovery filter corresponding to the captured state.

There is a well known technique of improving the image quality by performing image recovery processing using the point spread function of an optical imaging system for a captured image to correct various aberrations.

In an actual capturing operation, however, the captured state of an input image may not optimally coincide with the state of an image recovery filter to be applied.

An example is a captured image of a stereoscopic object. Since an image capture apparatus captures an image by focusing on one plane in an object space by an auto focus function or manual focusing, an object positioned in the focal plane is captured relatively sharply. Another object (including a portion of the same object, which is at a position different from the focal plane) is captured with an amount of blur corresponding to a distance from the focal plane.

If information about an object distance includes only the distance from the focal plane, an optimum image recovery filter for the object distance and the angle of view is selected or generated to be used. Consequently, since the optimum image recovery filter is applied to the in-focus object, it is possible to obtain a desired recovery result for such an object. Since, however, the image recovery filter is not optimum for an out-of-focus object, the recovery effect is obtained to some extent but blur cannot be canceled for such an object.

On the other hand, blur of an object in a photo is used as a method of producing a stereoscopic effect for an object or representing an object of interest. For example, there is a photographic technique in which a telephoto lens having a shallow depth of field is used to focus on a main object, and the background is intentionally blurred. In consideration of the presence of such a photographic technique, the above-described image recovery processing in which an in-focus object is made sharper and an out-of-focus object remains blurred may be appropriate.

If, however, image recovery processing is executed using an image recovery filter which is optimum for an object at an in-focus distance and is not optimum for an object at an out-of-focus distance, coloring may occur in the object at the out-of-focus distance. Coloring herein indicates that a color (false color) which the object does not have appears at the edge portion of the object (out-of-focus object) at the out-of-focus distance of the image after the image recovery processing because the relationship between the degrees of blur of the respective color components of the image before the image recovery processing is different from that after the image recovery processing.

Such coloring may also occur in an operation other than an operation of capturing a stereoscopic object. Coloring essentially occurs when the state of aberrations in capturing an image is different from that of aberrations which are corrected by an image recovery filter to be applied, regardless of whether an object is in focus. This may be caused by, for example, a manufacturing variation of the optical imaging system and a variation in spectrum of a light source in capturing an image.

As a method of reducing such coloring, there is provided a method of correcting the color of an image after image recovery processing based on the color information of an image before the image recovery processing. That is, the method is for reducing coloring due to the image recovery processing by determining a change in color due to the image recovery processing in each pixel of the image.

If the image sensor has a Bayer array color filter, an image obtained by the image sensor is a RAW image in which each pixel has one of R, G, and B color components. Two image recovery processes for such a RAW image are considered. The first method applies color interpolation processing to a RAW image so that each pixel has all of R, G, and B color components, and then, applies an image recovery filter to each of R, G, and B planes. The second method applies an image recovery filter to a RAW image in which each pixel has one color component without application of color interpolation processing.

In the method of applying an image recovery filter to each color plane, the number of pixels to be applied with the image recovery processing and the number of taps of the image recovery filter are large, as compared with the method of applying an image recovery filter to a RAW image, thereby significantly increasing the load of the image recovery processing. If, therefore, a low processing load is required, the method of applying the image recovery processing to a RAW image is used. Even when the image recovery processing is applied to a RAW image, coloring may occur in an output image obtained by applying so-called development processing including color interpolation processing to the RAW image if the state of aberrations in capturing the image is different from that of aberrations which are corrected by an image recovery filter to be applied. Coloring that occurs in the image recovery processing which is executed for a RAW image to improve the image quality of an output image results in a degradation in image quality which cannot be ignored, and needs to be sufficiently suppressed.

Since, however, each pixel of a RAW image has only one color component as described above, there is no color information necessary for measuring a change in color before and after the image recovery processing. It is, therefore, impossible to apply, intact, the above-described method of correcting the color of an image after the image recovery processing based on the color information of an image before the image recovery processing.

The method disclosed in Japanese Patent No. 3532368 attempts to complement the shallow depth of field of the optical imaging system by executing the image recovery processing for an out-of-focus range of a captured image. In the image recovery processing described in Japanese Patent No. 3532368, even though it is possible to improve the sharpness of the out-of-focus range, coloring that occurs in the image recovery processing applied to a RAW image cannot be sufficiently suppressed.

SUMMARY OF THE INVENTION

The present invention has been made in consideration of the aforementioned problems of the conventional technique, and provides an image processing apparatus, an image capture apparatus, and image processing method, which enable suppression of coloring that occurs in image recovery processing for a RAW image.

According to an aspect of the present invention, there is provided an image processing apparatus for correcting degradation in image quality, due to aberrations of an optical imaging system of an image capture apparatus, in a RAW image which has been captured by the image capture apparatus and in which each pixel has one color component, the image processing apparatus comprising: a first pixel interpolation unit configured to execute pixel interpolation processing for a predetermined reference color component of the RAW image; a first obtaining unit configured to obtain, for each color component other than the reference color component of the RAW image, a first color difference using a pixel value of the color component and a pixel value of the reference color component after the pixel interpolation processing; an image recovery processing unit configured to apply an image recovery filter based on a function representing the aberrations of the optical imaging system to each color component of the RAW image; a second pixel interpolation unit configured to execute pixel interpolation processing for the reference color component of the RAW image to which the image recovery filter has been applied; a second obtaining unit configured to obtain, for each color component other than the reference color component of the RAW image to which the image recovery filter has been applied, a second color difference using a pixel value of the color component and a pixel value of the reference color component, after the pixel interpolation processing by the second pixel interpolation unit; and a pixel value correction unit configured to correct a pixel value of the RAW image to which the image recovery filter has been applied, according to a difference between the first color difference and the second color difference.

According to another aspect of the present invention, there is provided an image capture apparatus comprising: an optical imaging system for imaging an optical image of an object; an image sensor for capturing the optical image; and an image processing apparatus for correcting degradation in image quality, due to aberrations of an optical imaging system of an image capture apparatus, in a RAW image which has been captured by the image capture apparatus and in which each pixel has one color component, the image processing apparatus comprising: a first pixel interpolation unit configured to execute pixel interpolation processing for a predetermined reference color component of the RAW image; a first obtaining unit configured to obtain, for each color component other than the reference color component of the RAW image, a first color difference using a pixel value of the color component and a pixel value of the reference color component after the pixel interpolation processing; an image recovery processing unit configured to apply an image recovery filter based on a function representing the aberrations of the optical imaging system to each color component of the RAW image; a second pixel interpolation unit configured to execute pixel interpolation processing for the reference color component of the RAW image to which the image recovery filter has been applied; a second obtaining unit configured to obtain, for each color component other than the reference color component of the RAW image to which the image recovery filter has been applied, a second color difference using a pixel value of the color component and a pixel value of the reference color component, after the pixel interpolation processing by the second pixel interpolation unit; and a pixel value correction unit configured to correct a pixel value of the RAW image to which the image recovery filter has been applied, according to a difference between the first color difference and the second color difference.

According to further aspect of the present invention, there is provided an image processing method of correcting for degradation in image quality, due to aberrations of an optical imaging system of an image capture apparatus, in a RAW image which has been captured by the image capture apparatus and in which each pixel has one color component, the method comprising: a first pixel interpolation step of executing pixel interpolation processing for a predetermined reference color component of the RAW image; a first obtaining step of obtaining, for each color component other than the reference color component of the RAW image, a first color difference using a pixel value of the color component and a corresponding pixel value of the reference color component, after the pixel interpolation processing; an image recovery processing step of applying an image recovery filter based on a function representing the aberrations of the optical imaging system to each color component of the RAW image; a second pixel interpolation step of executing pixel interpolation processing for the reference color component of the RAW image to which the image recovery filter has been applied; a second obtaining step of obtaining, for each color component other than the reference color component of the RAW image to which the image recovery filter has been applied, a second color difference using a pixel value of the color component and a corresponding pixel value of the reference color component, after the pixel interpolation processing in the second pixel interpolation step; and a pixel value correction step of correcting a pixel value of the RAW image to which the image recovery filter has been applied, according to a difference between the first color difference the second color difference.

Further features of the present invention will become apparent from the following description of embodiments with reference to the attached drawings.

BRIEF DESCRIPTION OF THE DRAWINGS

FIG. 1 is a block diagram showing an example of the arrangement of an image capture apparatus as an example of an image processing apparatus according to an embodiment of the present invention;

FIG. 2 is a block diagram showing a functional arrangement of an image recovery processing unit according to the first embodiment of the present invention;

FIGS. 4A to 4E are views for explaining a RAW image obtained by an image sensor having a Bayer array primary color filter;

FIGS. 5A to 5K are views for explaining pixel interpolation processing of the image recovery processing according to the first embodiment of the present invention;

FIGS. 9A and 9B are views for explaining the operation and effect of the image recovery processing according to the first embodiment of the present invention;

FIGS. 10A to 10D are graphs each showing an example of the MTFs of an optical imaging system of the image capture apparatus according to the embodiment of the present invention and the spatial frequency characteristics of the MTFs after application of the image recovery filter;

FIG. 10E is a graph showing the rates of increase/decrease (recovery gains) of the MTFs of the image capture apparatus according to the embodiment of the present invention, which are obtained by applying the image recovery filter;

FIG. 11 is a block diagram showing another functional arrangement of the image recovery processing unit according to the first embodiment of the present invention;

FIG. 15 is a block diagram showing a functional arrangement of an image recovery processing unit according to the second embodiment of the present invention;

FIG. 16 is a flowchart illustrating image recovery processing according to the second embodiment of the present invention;

FIGS. 19A and 19B are views for explaining the operation and effect of the image recovery processing according to the second embodiment of the present invention.

DESCRIPTION OF THE EMBODIMENTS

Figure 3:
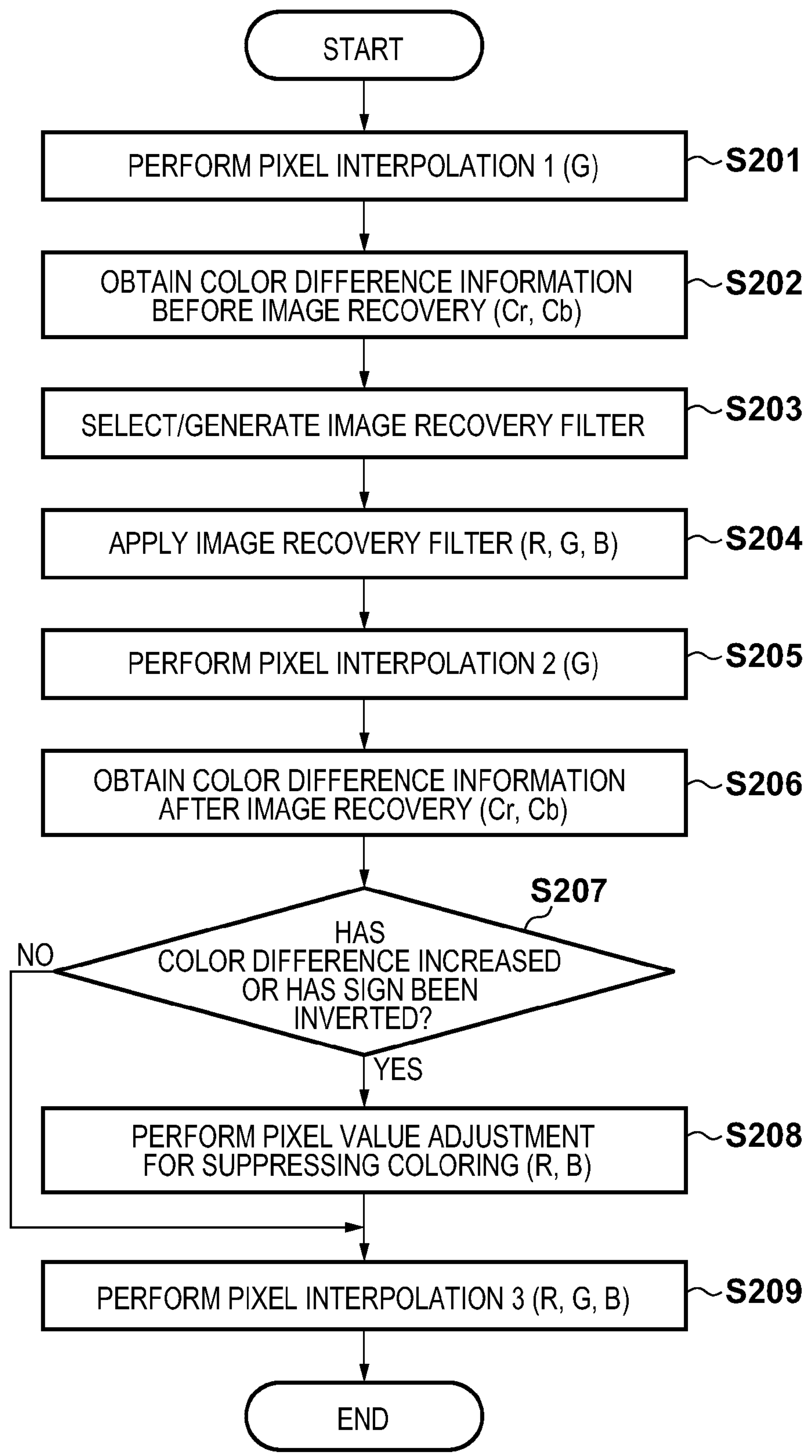
FIG. 3 is a flowchart illustrating image recovery processing according to the first embodiment of the present invention.

Embodiments of the present invention will now be described in detail in accordance with the accompanying drawings.

(Arrangement of Image Capture Apparatus)

FIG. 1 is a block diagram showing the arrangement of an image capture apparatus as an example of an image processing apparatus according to the embodiment of the present invention. In this embodiment, a case wherein an image capture apparatus including an optical imaging system and an image sensor, to which the present invention is applied will be described. However, components for generating a captured image such as an optical imaging system and image sensor are not essential in the present invention.

An optical imaging system 101 images an optical image of an object (not shown) on an image sensor 102. The image sensor 102 converts the image into an electrical signal, which is converted into a digital signal by an A/D converter 103 and is input to an image processing unit 104. The image processing unit 104 includes an image recovery processing unit 111, and another image processing unit 112 for executing image processing other than image recovery processing. The image recovery processing unit 111 obtains captured state information of the image capture apparatus from a state detection unit 107. The state detection unit 107 may obtain captured state information of the image capture apparatus directly from a system controller 110, or may obtain captured state information associated with the optical imaging system 101 from an optical imaging system control unit 106.

Then, the image recovery processing unit 111 selects an image recovery filter corresponding to the captured state from, for example, a storage unit 108, and executes chromatic difference of magnification correction processing and image recovery filter application processing for the image input to the image processing unit 104. The image recovery processing unit 111 will be described in detail later. The storage unit 108 may hold information necessary for generating an image recovery filter (for example, information about a point spread function or optical transfer function) instead of the image recovery filter. In this case, the image recovery processing unit 111 selects information about a point spread function or optical transfer function corresponding to the captured state from the storage unit 108 to generate an image recovery filter corresponding to the captured state, and uses the generated image recovery filter to execute the image recovery processing. The other image processing unit 112 executes predetermined image processing such as gamma correction and color balance adjustment for the image after the image recovery processing, thereby generating an image file such as a JPEG file.

The system controller 110 stores an output image processed by the image processing unit 104 in an image recording medium 109 in a predetermined format. A display unit 105 may display an image obtained by executing predetermined processing for display for the image after the image recovery processing, or an image which has not undergone the image recovery processing or has undergone simple recovery processing.

The system controller 110 performs a series of control operations, and the optical imaging system control unit 106 mechanically drives the optical imaging system 101 (an aperture stop 101$a$, a focusing lens 101$b$, an optical zoom, and the like) in response to an instruction from the system controller 110. The system controller 110 is, for example, a programmable controller such as a CPU or MPU, and implements the overall operation of the image capture apparatus by executing a program stored in the storage unit 108. Note that although the image processing unit 104 may be implemented by hardware, at least part of the image processing unit 104 can also be implemented by the system controller 110 in a software manner.

The diameter of the aperture stop 101$a$ is controlled as captured state setting of an F-number. The position of the focusing lens 101$b$ is controlled by an auto focus (AF) mechanism or manual focus mechanism (not shown) to adjust its focus according to an object distance. The optical imaging system 101 may include an optical element such as a low-pass filter or infrared cut filter. Note that when an element such as a low-pass filter which influences the characteristics of an optical transfer function is used, a change in optical transfer function due to the optical element is considered in creating an image recovery filter. The infrared cut filter also influences the point spread function of each of R, G, and B channels as the integral of the point spread function of a spectroscopy wavelength. This is especially true for the point spread function of the R channel. Thus, a change in point spread function due to the infrared cut filter is preferably taken into account when creating an image recovery filter.

Although the optical imaging system 101 is shown as part of the image capture apparatus in FIG. 1, it may have an interchangeable arrangement like a lens-interchangeable camera.

(Image Recovery Processing Unit 111)

FIG. 2 is a block diagram showing a functional arrangement of the image recovery processing unit 111. FIG. 3 is a flowchart for explaining the image recovery processing in the image recovery processing unit 111.

A RAW image in which each pixel has one color component as shown in FIG. 4A is input to the image recovery processing unit 111. As shown in FIGS. 4B to 4D, each color component has a value in only some pixels. The processing in the image recovery processing unit 111 is executed for each color component (color plane) shown in FIG. 4B, 4C, or 4D. Although FIGS. 4B to 4D show a case in which the RAW image is input by each color component, the RAW image may be input by being separated into the respective color planes, or may be processed by reading out only necessary color components from a memory storing the RAW image.

In step S201 of FIG. 3, a first pixel interpolation unit 1001 applies pixel interpolation processing to G components (FIG. 4B) to obtain the value of a G component for pixels without a G component value. With this pixel interpolation processing, it is ensured that each pixel has a G component value, as shown in FIG. 4E.

In step S202, a pre-recovery color difference calculation unit (R) 1002 obtains color difference information before the image recovery processing based on the G components (FIG. 4E) after the pixel interpolation processing, and R components (FIG. 4C) which have not undergone pixel interpolation. Similarly, a pre-recovery color difference calculation unit (B) 1003 obtains color difference information before the image recovery processing based on the G components (FIG. 4E) after the pixel interpolation processing, and B components (FIG. 4D) which have not undergone pixel interpolation.

In this embodiment, a color difference is defined as a difference with respect to the signal value of a reference color component (G in this case). Color differences C1$r$ and C1$b$ of the R and B components other than the reference color component with respect to the G component are respectively calculated by:

$$C1r(x,y)=R1(x,y)-G1(x,y) \tag{6}$$

$$C1b(x,y)=B1(x,y)-G1(x,y) \tag{7}$$

where (x, y) represents a coordinate value on the image.

Note that since the R and B components have not undergone pixel interpolation as described above, a pixel for which a color difference is calculated in step S202 is only a pixel which has the value of an R or B component other than the reference color component. That is, the pre-recovery color difference calculation unit (R) 1002 calculates C1$r$(x, y) only for a pixel with “R” in FIG. 4C, and the pre-recovery color difference calculation unit (B) 1003 calculates C1$b$(x, y) only for a pixel with “B” in FIG. 4D.

As described above, when the first pixel interpolation unit 1001 performs pixel interpolation for the reference color components (G components), it is possible to obtain color difference information before application of the image recovery filter, which is necessary for coloring suppression processing, without performing pixel interpolation for the other color components (R and B components). There have been disclosed various conventional pixel interpolation techniques for a RAW image obtained by an image sensor having a Bayer array color filter, and the first pixel interpolation unit 1001 can use an arbitrary known method. For example, the value of the specific color component of a target pixel can be obtained by an interpolation method determined using the values of other color components of surrounding pixels. That is, when the value of the G component of a given pixel is generated by interpolation processing, an interpolation method for the G component is determined using the values of the R and B components of surrounding pixels. As compared with a method of simply linearly interpolating the values of neighboring same color components, such an adaptive method can suppress occurrence of a false color or a decrease in sharpness due to the interpolation processing.

Figures 5A, 5B, 5C, 5D, 5E:
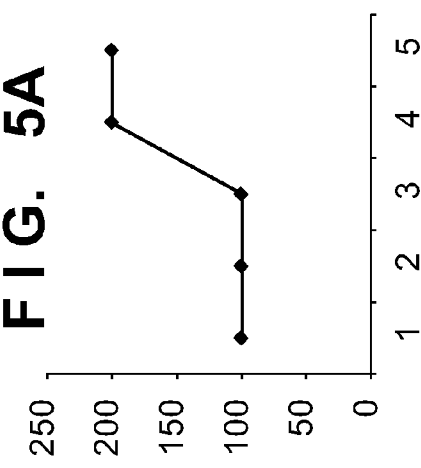

An example of the adaptive pixel interpolation method will be further described with reference to FIGS. 5A to 5K. FIG. 5A shows an example of pixel values arranged in the direction perpendicular to an achromatic edge of the image. Since the edge is achromatic, the values of the R, G, and B components of each pixel of the image sensor are equal to each other. As shown in FIG. 5B, the image is formed by pixels with (R, G, B)=(100, 100, 100) and pixels with (R, G, B)=(200, 200, 200). Since each pixel of a RAW image captured by a Bayer array image sensor actually has one color component, arrangements shown in FIGS. 5C to 5E are obtained by extracting values for each color component. In FIGS. 5C to 5E, a black pixel represents a pixel which requires interpolation. In this case, it is obvious that the value of each color component after pixel interpolation processing is ideally as shown in FIG. 5B.

The pixel arrangements shown in FIG. 5C to 5E are described by G(x, y), R(x, y), and B(x, y), respectively, hereinafter. Note that x represents a coordinate in the horizontal direction and y represents a coordinate in the vertical direction. As shown in FIGS. 5C to 5E, the pixel at the upper-left corner has a coordinate value (0, 0) and the pixel at the lower-right corner has a coordinate value (4, 4).

As described above, in step S201, the first pixel interpolation unit 1001 executes pixel interpolation processing for the G components. An example of the pixel interpolation processing of adaptively generating the value of the G component of each black pixel shown in FIG. 5C using pixel information of other surrounding color components will be described below.

(For example, when the value of the G component of a pixel having the value of the R component like G(1, 2) is obtained:

$$H\_DIFF=(R(x,y)-R(x-2,y))+(R(x,y)-R(x+2,y)) \tag{8}$$

$$V\_DIFF=(R(x,y)-R(x,y-2))+(R(x,y)-R(x,y+2)) \tag{9}$$

$$\text{if } |H\_DIFF|>|V\_DIFF| \; G(x,y)=(G(x,y-1)+G(x,y+1))/2 \tag{10}$$

$$\text{if } |H\_DIFF|\le|V\_DIFF| \; G(x,y)=(G(x-1,y)+G(x+1,y))/2 \tag{11}$$

As described above, the change amount H_DIFF of pixel values in the horizontal direction and the change amount V_DIFF of pixel values in the vertical direction, which have been calculated based on surrounding pixel values are obtained for the color component of a target pixel, and a direction in which the absolute value of the change amount is smaller is determined. Then, a pair of pixel values with same color components, between which the target pixel exists are interpolated (averaged in this example), thereby obtaining the value of the color component of the target pixel. FIG. 5I shows the result of such adaptive pixel interpolation processing. Each of FIGS. 5F to 5H shows the result of pixel interpolation processing of performing interpolation by simply averaging the pixel values of the surrounding pixels with same color components without applying the adaptive image interpolation processing described with reference to equations (8) to (11). As is apparent by comparing FIGS. 5I and 5F with each other, each of which is obtained by executing pixel interpolation processing for the G pixels, sharpness when the adaptive pixel interpolation processing is executed does not decrease as compared with the case in which the linear interpolation processing is executed.

The case in which the value of a G component is generated for a pixel with the value of an R component has been described. Like G(2, 1), it is possible to similarly generate the value of a G component for a pixel with the value of a B component.

The above-described pixel interpolation method is merely an example. As a pixel interpolation method used by the first pixel interpolation unit 1001, another method including a simple linear interpolation method can be adopted.

Referring back to FIG. 3, in step S203, a recovery filter application unit (G) 1004, recovery filter application unit (R) 1005, and recovery filter application unit (B) 1006 select an image recovery filter appropriate for image capturing conditions. At this time, the selected image recovery filter may be corrected, as needed. This corresponds to an operation of correcting an image recovery filter according to the actual captured state in executing the image recovery processing by preparing discrete captured state data in order to decrease the amount of data of image recovery filters prepared in advance in the storage unit 108. Furthermore, instead of selecting an image recovery filter, the image recovery filter may be generated according to the captured state based on information about an optical transfer function necessary for generating an image recovery filter.

In step S204, the recovery filter application unit (G) 1004, recovery filter application unit (R) 1005, and recovery filter application unit (B) 1006 use the image recovery filter selected or generated in step S203 to execute convolution processing for each pixel for each color component of the input image. Details of the convolution processing are as described above with reference to equation (5). This enables to correct the asymmetry of a point spread function due to the aberrations of the optical imaging system 101, thereby removing or reducing the blur components of the image.

Figure 6A:
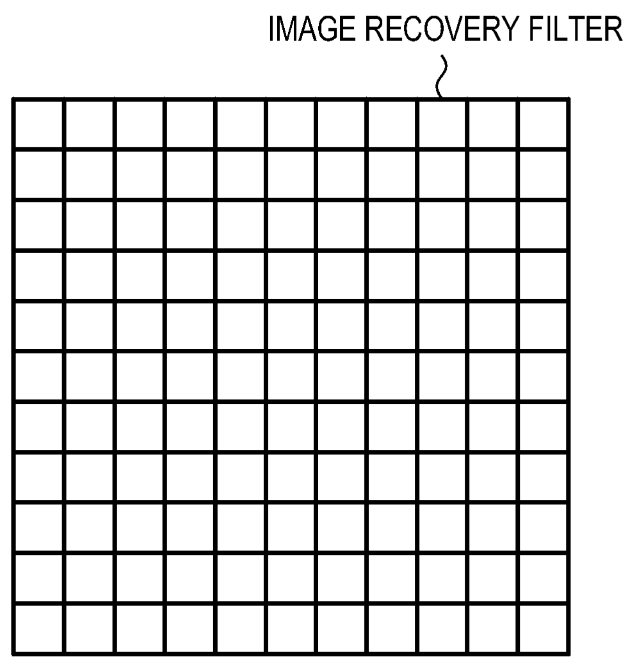
FIGS. 6A and 6B are views for explaining an image recovery filter according to the first embodiment of the present invention.

As described above, when the image recovery filter is applied to a two-dimensional image, it is formed as a two-dimensional filter having taps corresponding to pixels, and the number of taps can be determined based on the aberration characteristics of the optical imaging system and required recovery accuracy. FIG. 6A schematically shows, as an example, an image recovery filter formed as a two-dimensional filter having 11×11 taps, that is, 11 taps in each of the horizontal and vertical directions. Note that the image recovery filter shown in FIG. 6A is an example of an image recovery filter applied to each color plane of the image in which each pixel has R, G, and B color components.

Using, as an image recovery filter, the two-dimensional filter shown in FIG. 6A which has 100 or more taps, it is possible to recover aberrations which widely spread from an imaging position, such as the spherical aberration, coma aberration, axial chromatic aberration, and off-axis color flare of the optical imaging system.

Figure 6B:
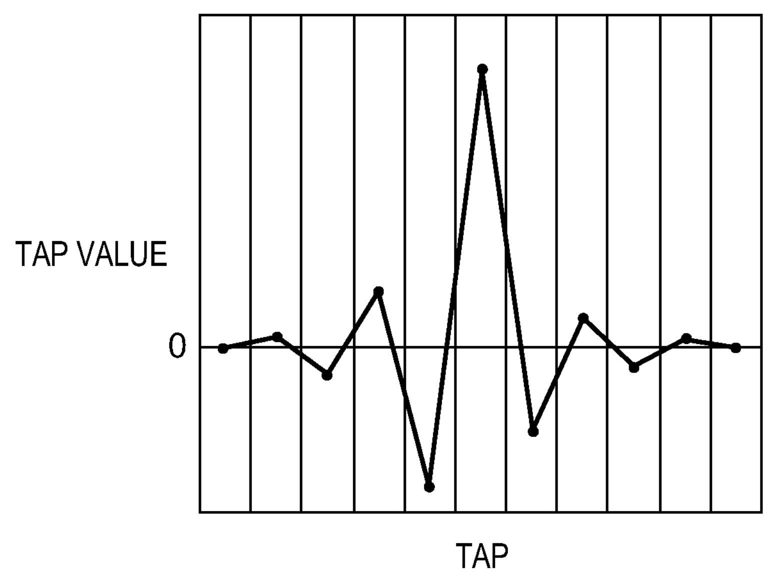

Although FIG. 6A does not show the value (coefficient value) of each tap, FIG. 6B shows an example of distribution of the tap coefficients of one horizontal line of the image recovery filter. The distribution of the values (coefficient values) of the taps of the image recovery filter serves to return a point spread function which spatially spreads due to the aberrations of the optical imaging system to ideally an original one point (when the influence of diffraction is ignored).

The tap coefficient value of the image recovery filter is used for the convolution processing (a convolution integral operation, a product-sum operation) executed for each pixel in a step of the image recovery processing. In the convolution processing, a pixel to be processed is made coincide with the central tap of the image recovery filter to apply the image recovery processing to the signal value of the pixel to be processed. At each tap position of the image recovery filter, the product of a corresponding pixel signal value and tap coefficient value is obtained, and the signal value of the pixel to be processed is substituted by the sum of the products.

It is possible to obtain such an image recovery filter by calculating or measuring the optical transfer function of the optical imaging system as described above, and performing inverse Fourier transform for the inverse function of the optical transfer function. Note that since an actual image includes a noise component, using the image recovery filter created by obtaining the complete inverse of the optical transfer function amplifies the noise component, thereby making it more difficult to obtain a high-quality recovered image. There is a well known a method of suppressing noise in a recovered image using an image recovery filter for suppressing the recovery ratio on the high frequency side of the image according to a strength ratio between an image signal and a noise signal, like a Wiener filter (to be described later).

Furthermore, the optical transfer function can include factors to degrade the optical transfer function for an image input to the image processing unit 104, in addition to the optical imaging system. For example, a low-pass filter suppresses a high-frequency component in the frequency characteristics of the optical transfer function. Furthermore, the pixel aperture ratio and the shape of the pixel aperture of the image sensor influence the frequency characteristics. The spectral characteristics of a light source and those of various wavelength filters also influence the optical transfer function. It is, therefore, desirable to create an image recovery filter based on a generalized optical transfer function including the various factors.

If the image is a color image in an RGB format, it is only necessary to create three image recovery filters respectively corresponding to R, G, and B color components. Since the degrees of blur of the respective color components are different from each other due to the chromatic aberration of the optical imaging system, the respective image recovery filters also have different characteristics depending on a target color component. More specifically, the distribution of tap values shown in FIG. 6B is different for each color component. The number of taps in the horizontal and vertical directions of the image recovery filter need not be equal to each other, and can be arbitrarily changed within a range where the convolution processing is possible.

Figure 7A:
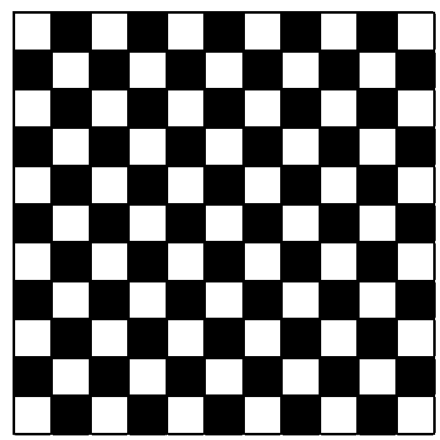
FIGS. 7A and 7B are views schematically showing an image recovery filter to be applied to a RAW image in which each pixel has only one color component.
Figure 7B:
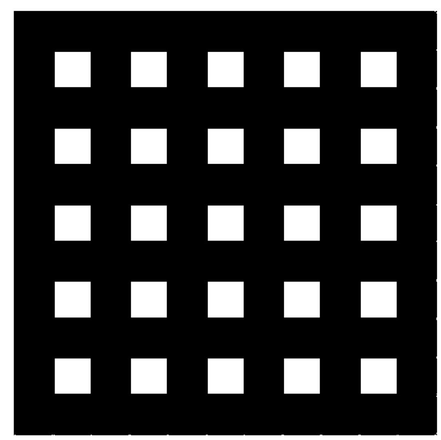

As opposed to the image recovery filter to be applied to each color plane of the image in which each pixel has R, G, and B color components, an example of an image recovery filter to be applied to a RAW image in which each pixel has only one color component is shown in FIGS. 7A and 7B. A tap corresponding to a pixel having a target color component has a coefficient. FIG. 7A schematically shows an image recovery filter provided for the G components. FIG. 7B schematically shows an image recovery filter to be applied to the R and B components. In FIGS. 7A and 7B, a black tap has a tap coefficient (the tap coefficient is non-zero) and a white tap has no tap coefficient (the tap coefficient is zero).

The recovery filter application unit (G) 1004 applies convolution processing using the image recovery filter shown in FIG. 7A to the G components (which have not undergone pixel interpolation) shown in FIG. 4B. Furthermore, the recovery filter application unit (R) 1005 and recovery filter application unit (B) 1006 apply convolution processing using the image recovery filter shown in FIG. 7B to the R components shown in FIG. 4C and the B components shown in FIG. 4D, respectively.

In step S205 of FIG. 3, a second pixel interpolation unit 1007 applies pixel interpolation processing to the G components applied with the image recovery filter. This is the same processing as that executed by the first pixel interpolation unit 1001 in step S201. This pixel interpolation processing changes the state shown in FIG. 4B to that shown in FIG. 4E in which each pixel has the value of a G component.

In step S206, a post-recovery color difference calculation unit (R) 1008 and post-recovery color difference calculation unit (B) 1009 obtain color difference information. Color calculation performed here is the same as that performed by the pre-recovery color difference calculation unit (R) 1002 and pre-recovery color difference calculation unit (B) 1003 in step S202, and the differences of R and B components with respect to a reference color component B are obtained according to the following equation. That is, color differences C2*r* and C2*b* of R and B components with respect to a G component are defined by:

$$C2r(x,y)=R(x,y)-G(x,y) \tag{12}$$

$$C2b(x,y)=B(x,y)-G(x,y) \tag{13}$$

As described above, by performing pixel interpolation for only G components in the second pixel interpolation unit 1007, it is possible to obtain color difference information after application of the image recovery filter, which is necessary for coloring suppression processing.

In step S207, a pixel value adjustment unit (R) 1010 determines based on the pieces C1*r* and C2*r* of color difference information whether pixel value adjustment for suppressing coloring is necessary for the R components, and a pixel value adjustment unit (B) 1011 determines based on the pieces C1*b* and C2*b* of color difference information whether pixel value adjustment for suppressing coloring is necessary for the B components. These determination processes can be made based on whether the color difference has increased or whether the sign of the color difference has been inverted, as will be described below.

The pixel value adjustment unit (R) 1010 or pixel value adjustment unit (B) 1011 makes the following determination for the R or B component of each pixel. If any one of the following conditions is satisfied, it is determined that pixel value adjustment for suppressing coloring is necessary for the value of a corresponding color component.

Determination for R, which is Made by Pixel Value Adjustment Unit (R) 1010

Determination Condition 1:

C1*r*(x, y) and C2*r*(x, y) have the same sign and |C1*r*(x, y)|<|C2*r*(x, y)|.

Determination Condition 2:

C1*r*(x, y) and C2*r*(x, y) have different signs.

Determination for B, which is Made by Pixel Value Adjustment Unit (B) 1011

Determination Condition 1:

C1*b*(x, y) and C2*b*(x, y) have the same sign and |C1*b*(x, y)|<|C2*b*(x, y)|.

Determination Condition 2:

C1*b*(x, y) and C2*b*(x, y) have different signs.

In step S208, the pixel value adjustment unit (R) 1010 or pixel value adjustment unit (B) 1011 applies pixel value adjustment for suppressing coloring to a pixel for which it has been determined as a determination result that pixel value adjustment is necessary. As will be described below, the pixel value adjustment processing may use the color difference before the image recovery processing if the color difference has increased, and set the color difference to 0 when the sign of the color difference has been inverted.

Pixel Value Adjustment for R, which is Performed by Pixel Value Adjustment Unit (R) 1010 if determination condition 1 is satisfied (the color difference has increased):

$$R2(x,y)=G2(x,y)+k\times C1r(x,y)(0<k\leq 1) \tag{14}$$

if determination condition 2 is satisfied (the sign of the color difference has been inverted):

$$R2(x,y)=G2(x,y) \tag{15}$$

Pixel Value Adjustment for B, which is Performed by Pixel Value Adjustment Unit (B) 1011 if determination condition 1 is satisfied (the color difference has increased):

$$B2(x,y)=G2(x,y)+k\times C1b(x,y)(0<k\leq 1) \tag{16}$$

if determination condition 2 is satisfied (the sign of the color difference has been inverted):

$$B2(x,y)=G2(x,y) \tag{17}$$

In step S209, the image recovery filter is applied, and a third pixel interpolation unit 1012 executes pixel interpolation processing for each of the R, G, and B color components which have undergone the pixel value adjustment processing for suppressing coloring. The adaptive pixel interpolation processing applied to the G components by the third pixel interpolation unit 1012 may be the same as that executed by the first pixel interpolation unit 1001 or second pixel interpolation unit 1007.

On the other hand, an adaptive pixel interpolation processing method for the R and B components can be executed as follows. A case in which adaptive interpolation for generating, for a pixel, shown in FIG. 5D, without the value of an R component before interpolation, the value of an R component using information of surrounding pixels having other color components will now be described.

The third pixel interpolation unit 1012 can execute the adaptive pixel interpolation processing for the R components using the values of the G components interpolated in advance depending on a direction in which neighboring pixels each having the value of an R component exist, as follows.

if the left and right neighboring pixels have values (for example, R(2, 0)):

$$Cr=(R(x-1,y)-G(x-1,y)+R(x+1,y)-G(x+1,y))/2 \tag{18}$$

$$R(x,y)=G(x,y)+Cr \tag{19}$$

if the upper and lower neighboring pixels have values (for example, R(1, 1)):

$$Cr=(R(x,y-1)-G(x,y-1)+R(x,y+1)-G(x,y+1))/2 \tag{20}$$

$$R(x,y)=G(x,y)+Cr \tag{21}$$

if the diagonally neighboring pixels have values (for example, R(2, 1)):

$$Cr=(R(x-1,y-1)-G(x-1,y-1)+R(x+1,y-1)-G(x+1,y-1)+R(x-1,y+1)-G(x-1,y+1)+R(x+1,y+1)-G(x+1,y+1))/4 \quad (22)$$

$$R(x,y)=G(x,y)+Cr \quad (23)$$

As described above, according to a direction in which neighboring pixels having the values of the same color components exist, the adaptive pixel interpolation processing is executed by interpolating color difference information (R−G) obtained for the neighboring pixels.

For pixel interpolation processing for the B components shown in FIG. 5E, according to a direction in which neighboring pixels having the value of the same color components exist, the adaptive pixel interpolation processing is executed by interpolating color difference information (R−B) obtained for the neighboring pixels, similarly to the above-described processing for the R components.

FIGS. 5I to 5K show examples of the values of the respective color components obtained by applying such the adaptive pixel interpolation processing. Furthermore, FIGS. 5F to 5H show examples of the values of the respective color components obtained by applying general linear pixel interpolation processing instead of the adaptive pixel interpolation processing. In the linear interpolation processing, values other than 100 and 200 are generated, and the sharpness decreases with respect to the ideal pixel arrangement shown in FIG. 5B. To the contrary, if the adaptive pixel interpolation processing is applied, the values of the R, G, and B components of each pixel are equal to each other, and each pixel arrangement coincide with that shown in FIG. 5B. When obtaining the color component of a given pixel, it is possible to suppress or prevent a decrease in sharpness due to interpolation by adaptively performing pixel interpolation according to the information of pixels having other color components around the given pixel.

Note that the pixel interpolation method described here is merely an example. As the pixel interpolation method used by the third pixel interpolation unit 1012, another method including a simple linear interpolation method can be adopted.

Figure 14A:
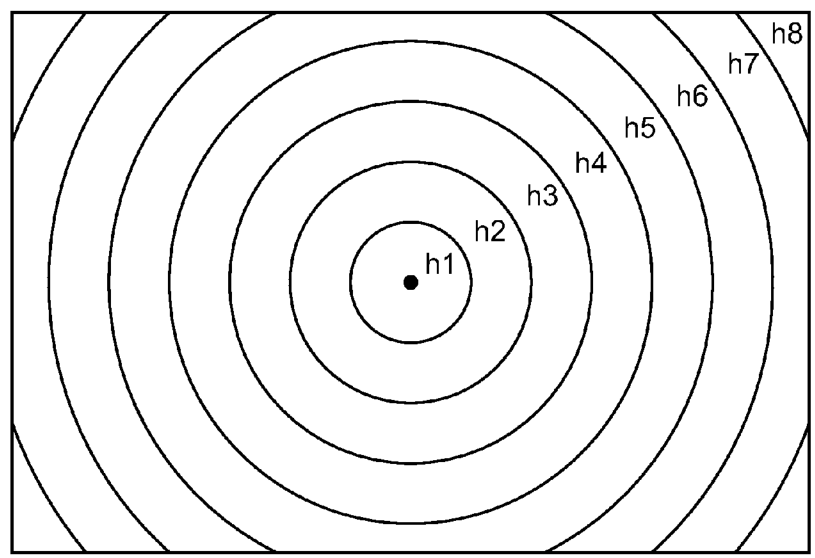
FIGS. 14A and 14B are views for explaining a chromatic difference of magnification correction data generation method according to the embodiment of the present invention.

The processing according to the flowchart shown in FIG. 3 executes the image recovery processing in the image processing unit 104 (image recovery processing unit 111). Note that since the optical transfer function of the optical imaging system 101 changes depending on the image height of the optical imaging system even in one captured state, it is desirable to change and execute the above-described image recovery processing for each region (for example, each of regions h1 to h8 in FIG. 14A) divided according to the image height. More specifically, it is only necessary to cause the image recovery filter to scan the image while executing convolution processing, thereby sequentially changing the filter for each region. That is, the processing in step S203 is executed for each target pixel.

Note that application of an image recovery filter=image recovery processing is assumed for the sake of simplicity and for easy understanding of the embodiment. The image recovery processing may include, as its part, another correction processing such as distortion correction processing, ambient light amount correction processing, and noise reduction processing.

An example of the operation and effect of obtaining of pieces of color difference information before and after the image recovery processing, application of the image recovery filter, and the pixel value adjustment for suppressing coloring, which are performed in steps S202, S204, S206, and S208 will be described with reference to FIGS. 9A and 9B.

Figure 8:
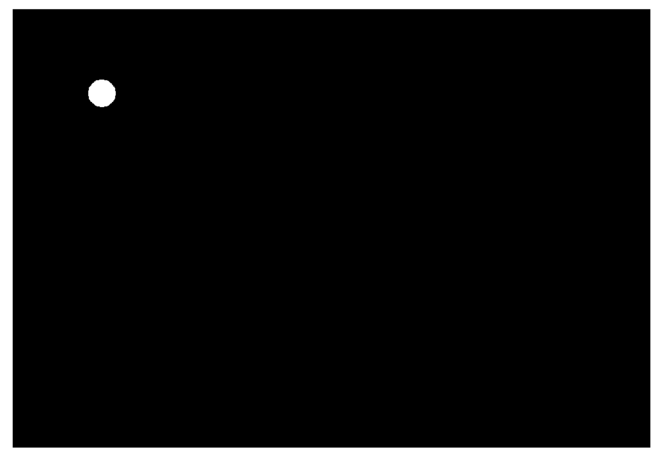
FIG. 8 is a view showing a point light source according to an embodiment of the present invention.
Figure 9A:
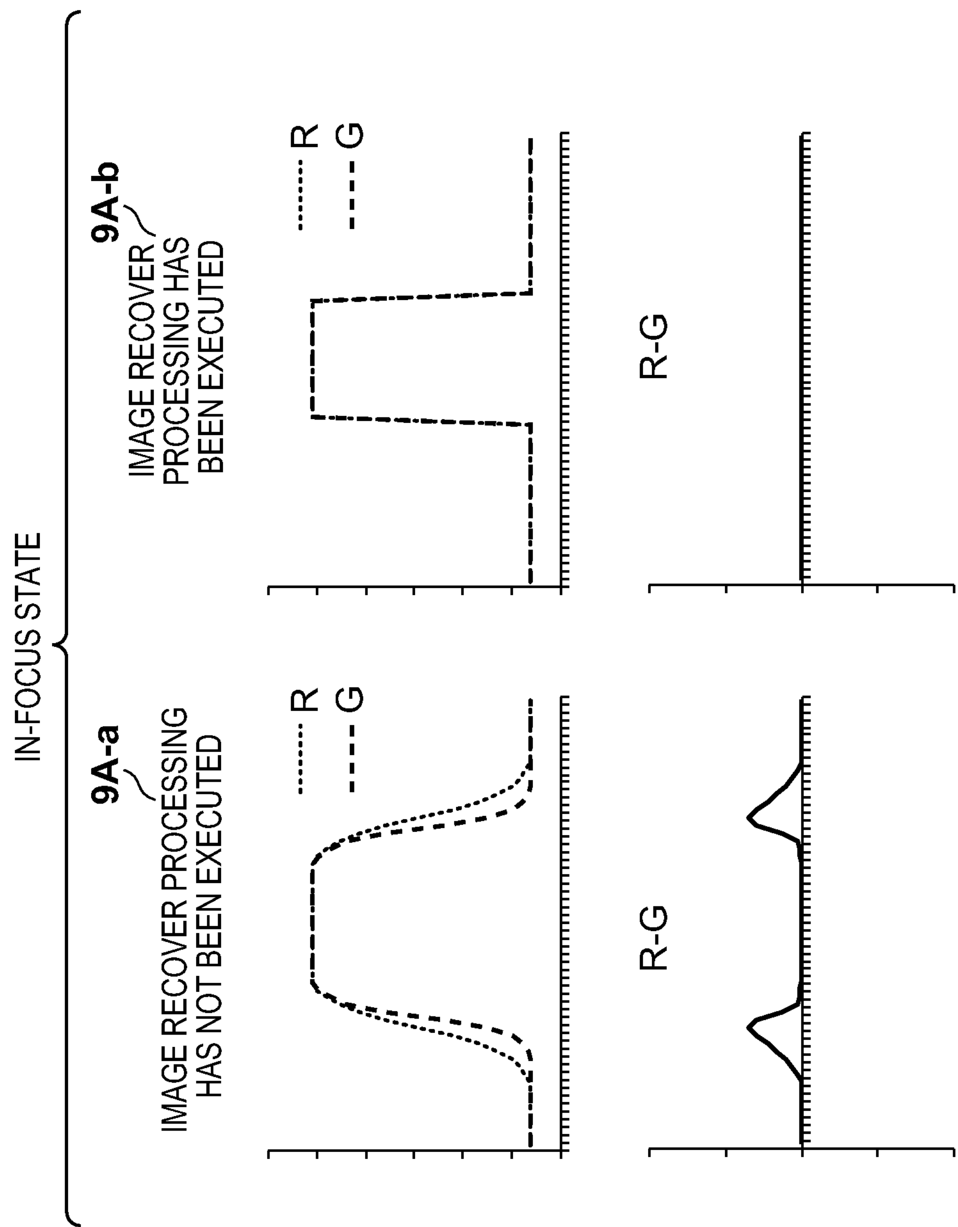

FIGS. 9A and 9B are schematic views each showing an example of pixel values, at and around a point light source in the horizontal direction, in an input shown in FIG. 8 that has been obtained by capturing a field of view, around the perimeter of which the point light source exists. In each of FIGS. 9A and 9B, an upper portion shows the pixel values of the R and G components, and a lower portion shows a difference between the values of the R and G components shown in the upper portion, that is, a color difference.

FIG. 9A shows an in-focus state. 9A-a of FIG. 9A shows a state in which the image recovery processing has not been applied, and each aberration remains in the image. Blur, therefore, occurs for both the G and R components, and a color fringing also occurs due to the different degrees of blur of the G and R components. In this case, a color difference has a positive value in each of the left and right edge portions.

On the other hand, 9A-b of FIG. 9A shows a state in which the image recovery processing has been applied to the RAW image, and the aberrations have been corrected to remove blur components. In 9A-b of FIG. 9A, no coloring occurs due to the image recovery processing in the in-focus state. In this case, in this embodiment, it is determined that pixel value adjustment for suppressing coloring is not necessary.

FIG. 9B shows an out-of-focus state. Similarly to 9A-a of FIG. 9A, 9B-a of FIG. 9B shows a state in which the image recovery processing has not been applied, and each aberration remains in the image. Although blur occurs for both the G and R components, the degrees of blur of the G and R components are equal to each other and, therefore, the color difference is 0 for the whole region. On the other hand, 9B-b of FIG. 9B shows a state in which the image recovery processing has been applied to the RAW image, and the aberrations have been corrected to reduce blur components. Since, however, the degrees of blur of the G and R components are different from each other, color fringing has occurred. In this case, the color difference has a negative value in each of the left and right edge portions.

Such color fringing that occurs in application of the image recovery processing is coloring to be suppressed in this embodiment. 9B-c of FIG. 9B shows a state in which the pixel value adjustment processing for suppressing coloring has been executed in step S208 in this embodiment. The coloring due to the image recovery processing has been appropriately suppressed, and a color difference is 0 for the whole region, similarly to 9B-a of FIG. 9B.

As described above, in this embodiment, it is possible to efficiently suppress coloring that occurs in application of the image recovery filter even when the image recovery processing is executed for a RAW image. A difference between the degrees of blur of each of the G and R components before and after application of the image recovery filter in each of the in-focus state shown in FIG. 9A and the out-of-focus state shown in FIG. 9B will be described with reference to FIGS. 10A to 10E. FIGS. 10A to 10D are graphs each schematically showing the MTFs of the optical imaging system 101 and the spatial frequency characteristics of the MTFs after application of the image recovery filter. FIG. 10E is a graph schematically showing the rate of increase/decrease (recovery gain) of the MTF obtained by applying the image recovery filter.

FIG. 10A shows the MTFs of the optical imaging system 101 in an in-focus state, in which the R component degrades, as compared with the G component. In 9A-a of FIG. 9A, the degrees of blur of the G and R components are different, and a change in pixel value of the R component spreads as compared with the G component in a point light source portion.

FIG. 10B shows the MTFs after application of the image recovery filter in an in-focus state, in which the MTFs of the G and R components have been appropriately corrected and the G and R components coincide with each other. This is obtained by multiplying the MTFs shown in FIG. 10A by the recovery gains shown in FIG. 10E, respectively. Since the image recovery filter has been designed to execute optimum image recovery processing for an in-focus object, appropriate image recovery processing is executed in an in-focus state. In the state shown in 9A-b of FIG. 9A after application of the image recovery processing, therefore, blur of the G and R components has been appropriately removed and color fringing has also been removed.

On the other hand, FIG. 10C shows the MTFs of the optical imaging system 101 in an out-of-focus state, in which the G and R components degrade and coincide with each other, as compared with the in-focus state shown in FIG. 10A. In 9B-a of FIG. 9B, the degrees of blur of the G and R components are equal to each other, and are larger than those in the in-focus state shown in 9A-a of FIG. 9A.

FIG. 10D shows the MTFs after application of the image recovery processing in the out-of-focus state, in which the MTFs of the G and R components have been corrected but the G component degrades as compared with the R component. This is obtained by multiplying the MTFs shown in FIG. 10C by the recovery gains shown in FIG. 10E, respectively. Since the image recovery filter has been designed to execute optimum image recovery processing for an in-focus object, an expected image recovery result may not be obtained in the out-of-focus state. In the state shown in 9B-b of FIG. 9B after application of the image recovery processing, therefore, the amounts of blur of the G and R components have decreased but the G component has spread as compared with the R component.

Note that the image recovery processing unit 111 of the embodiment is configured so that the G components of the input RAW image are input to the recovery filter application unit (G) 1004 for the G components intact, and an output from the recovery filter application unit (G) 1004 is input to the third pixel interpolation unit 1012 intact. As shown in FIG. 11, however, a first pixel thinning unit 1013 may thin out an output from the first pixel interpolation unit 1001 to input it to the recovery filter application unit (G) 1004, and a second pixel thinning unit 1014 may thin out an output from the second pixel interpolation unit 1007 to output it to the third pixel interpolation unit 1012.

In the arrangement shown in FIG. 2, a memory is required to hold the G components after the pixel interpolation processing, which have been generated by the first pixel interpolation unit 1001 and second pixel interpolation unit 1007, separately from the G components of the Bayer array. In the arrangement shown in FIG. 11, however, since the first pixel thinning unit 1013 and second pixel thinning unit 1014 thin out, after the pixel interpolation processing, the pixel values created by the interpolation processing to return to the state of the G components of the Bayer array, a memory is not required to hold the G components after the pixel interpolation processing.

As described above, in execution of the processing described in this embodiment, it is possible to hold image data being processed at various points. For example, color components to be input to the recovery filter application units 1004 to 1006 may be held for each color component, or the Bayer array itself may be held (without separating them into color planes). Like the arrangement shown in FIG. 2, the G components generated by the first pixel interpolation unit 1001 and second pixel interpolation unit 1007 may be held separately from the G components of the Bayer array. A method of holding data need only be determined according to the memory capacity of a system or the like, as needed.

As described above, according to this embodiment, only the G components of the RAW image undergo pixel interpolation to obtain pieces of color information before and after the image recovery processing for pixels of R and G components. Even if, therefore, coloring occurs due to the image recovery processing applied to the RAW image, it is possible to effectively suppress the coloring based on the pieces of color information obtained before and after the image recovery processing, thereby enabling to obtain a high-quality image recovery processing result. Furthermore, since pixel interpolation is performed for only the G components, an increase in processing load is small.

Second Embodiment

The second embodiment of the present invention will be described below. An image processing apparatus according to this embodiment may be the same as the image capture apparatus described in the first embodiment except for the arrangement and operation of an image recovery processing unit. The operation of the image recovery processing unit will be described below.

Correction of a chromatic difference of magnification and an image recovery filter without a chromatic difference of magnification correction component which is used in this embodiment will first be explained.

Figure 12A:
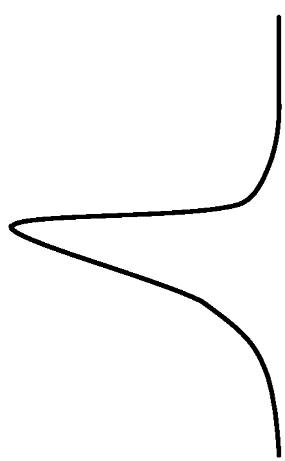
FIGS. 12A to 12D are graphs for explaining the characteristics in the real space and frequency space of image recovery processing according to an embodiment of the present invention.
Figure 12B:
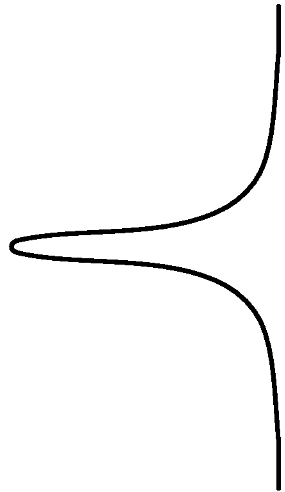
Figure 12C:
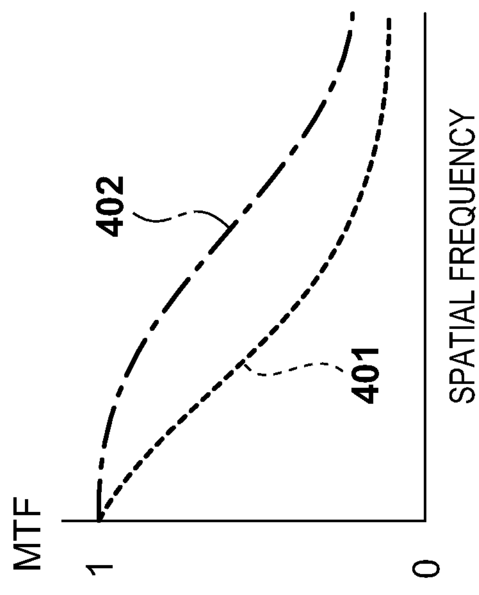
Figure 12D:
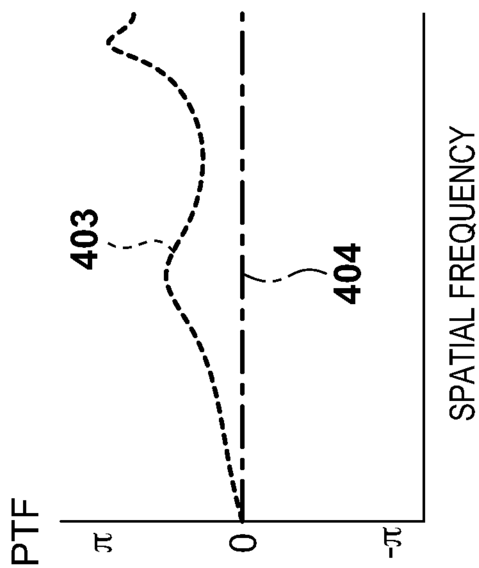

Image Recovery Filter without Chromatic Difference of Magnification Correction Component The characteristics in the real space and frequency space of the image recovery processing will be described with reference to FIGS. 12A to 12D. FIG. 12A shows a point spread function before the image recovery processing, and FIG. 12B shows a point spread function after the recovery processing. Referring to FIG. 12C, reference numeral 401 denotes an MTF before the image recovery processing; and 402, an MTF after the image recovery processing. Referring to FIG. 12D, reference numeral 403 denotes a PTF before the image recovery processing; and 404, a PTF after the image recovery processing. As is apparent from FIG. 12A, the point spread function before the image recovery processing asymmetrically spreads, which causes a corresponding PTF to have a non-zero value (denoted by reference numeral 403 in FIG. 12D). Since the image recovery processing amplifies the MTF as indicated by the MFP 402 in FIG. 12C, and corrects the PTF to zero as indicated by the PTF 404 in FIG. 12D, the point spread function after the image recovery processing is symmetric and sharp as shown in FIG. 12B.

It is possible to obtain an image recovery filter by performing inverse Fourier transform for a function which has been designed based on the inverse function (1/H) of the optical transfer function of an optical imaging system. Although the above-described Wiener filter can be used as an image recovery filter, another filter may be used. If the Wiener filter is used, it is possible to create an image recovery filter in a real space, which is to be used for convolution processing, by performing inverse Fourier transform for:

$$M(u, v) = \frac{1}{H(u, v)} \frac{|H(u, v)|^2}{|H(u, v)|^2 + SNR^2} \tag{24}$$

Figure 13A:
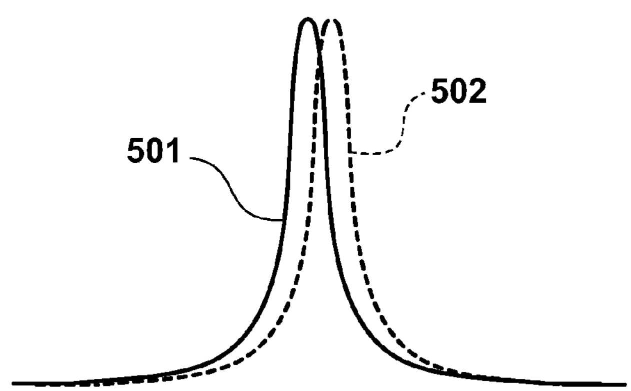
FIGS. 13A and 13B are graphs for explaining generation of an image recovery filter in consideration of a chromatic difference of magnification.
Figure 13B:
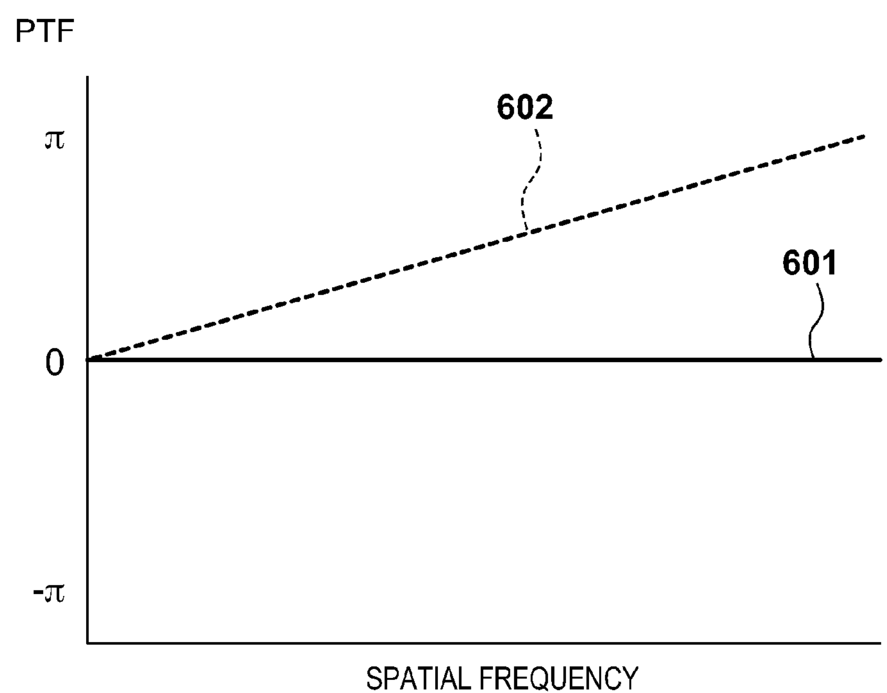

Generation of an image recovery filter in consideration of a chromatic difference of magnification will be described next. A curve 502 in FIG. 13A represents two color components which have been imaged as a point spread function with the same shape as that of a curve 501 at a position obtained by performing translation with reference to an imaging position of the curve 501. FIG. 13B shows PTFs at this time. Straight lines 601 and 602 in FIG. 13B correspond to the curves 501 and 502 in FIG. 13A. The straight line 602 represents that the phase has a slope. The image recovery filter can correct a linear PTF as shown in FIG. 13B and a nonlinear PTF like the PTF 403 of FIG. 12D, as represented by the straight line 601 in FIG. 13B, since the original optical transfer function includes such PTFs.

It is possible to generate an image recovery filter which does not correct a translation component of a chromatic difference of magnification by generating an image recovery filter based on an optical transfer function for which a linear component has previously been removed from a PTF. On the other hand, if a component of a chromatic difference of magnification is removed in the real space, it is possible to generate an optical transfer function for which a component of a chromatic difference of magnification has been removed, by generating a point spread function for which the curve 502 of FIG. 13A has been translated to the position of the curve 501 to reduce a difference between color components, and performing a Fourier transform for the generated point spread function. Since the shape of the point spread function of the curve 501 is actually different from that of the point spread function of the curve 502, a method of causing the barycenters of the curves to coincide with each other or a method of minimizing the root mean square value of the difference between the curves 501 and 502 can be used to align the curves, thereby decreasing the difference between color components. By generating an image recovery filter based on the optical transfer function, it is possible to generate an image recovery filter which corrects a component of at least one of spherical aberration, coma aberration, curvature of field and astigmatism and does not correct a translation component of a chromatic difference of magnification.

By applying the image recovery filter which does not correct a component of a chromatic difference of magnification, it becomes possible to process the chromatic difference of magnification independently of the image recovery processing. That is, it becomes possible to perform processing by separating correction and sharpening of asymmetrical aberrations for each color component from correction of a color deviation as a translation component of the chromatic difference of magnification.

Note that since the optical transfer function varies depending on the image height (the position of an image) of the optical imaging system even in the same captured state (the same zoom position and the same diameter of an aperture stop), the image recovery filter is desirably changed and used according to the image height.

(Detection and Correction of Chromatic Difference of Magnification)

It is possible to calculate a correction amount of a chromatic difference of magnification based on the design values of the optical imaging system, such as the linear component of a PTF and the shape of a point spread function, as described above. Since the color deviation and chromatic difference of magnification are used as synonyms for each other in this specification as described above, the chromatic difference of magnification can be processed as a shift amount of an R or B component with respect to a G component.

A method of correcting a chromatic difference of magnification in this embodiment will be described below.

A color deviation amount due to a chromatic difference of magnification generally changes depending on an image height indicating a distance from the optical center of the optical imaging system. Using a color deviation amount D for an image height L, a color deviation ratio M with respect to the image height is defined as:

$$M=D/L \tag{25}$$

Figure 14B:
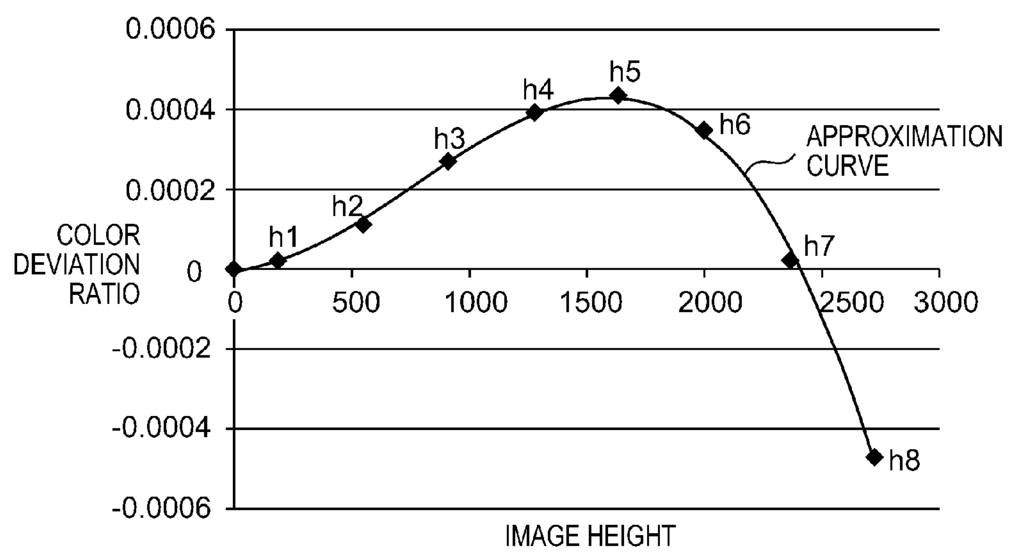

A high-order polynomial approximate equation F(l) representing the relationship between an image height l and the color deviation ratio M is calculated based on the image height (in this example, regions h1 to h8 shown in FIG. 14A) and color deviation ratio as shown in FIG. 14B, and is used as correction data. FIG. 14B shows a case in which correction data is calculated by a three-order polynomial equation represented by:

$$M=F(l)=al^3+bl^2+cl \tag{26}$$

where a, b, and c respectively represent coefficients.

A color deviation is corrected by shifting the pixel position of a target color component. More specifically, for example, the following method can correct a color deviation.

At a pixel (X, Y) in a plane (R plane, B plane) to be corrected, a color deviation ratio M at the pixel (X, Y) is obtained based on an image height L of the pixel (X, Y) and the correction data. Assume that a pixel corresponding to the optical center has coordinates (0, 0).

$$M=F(L) \tag{27}$$

Coordinates (X1, Y1) of a pixel to be generated by color deviation correction are obtained by:

$$X1=M\times X \tag{28}$$

$$Y1=M\times Y \tag{29}$$

A pixel value corresponding to the coordinates (X1, Y1) in the plane to be corrected is generated by general interpolation processing, and is set as the pixel value of the pixel (X, Y). These operations are executed for all pixels, thereby performing color deviation correction. Thus, the chromatic difference of magnification is corrected.

FIG. 15 is a block diagram showing a functional arrangement of an image recovery processing unit 111" of an image capture apparatus as an example of the image processing apparatus according to the second embodiment of the present invention. Referring to FIG. 15, the same functional blocks as those in the image recovery processing unit 111 according to the first embodiment are denoted by the same reference numerals. As is apparent by comparing FIGS. 2 and 15 with each other, this embodiment is characterized by having two recovery filter application units for G components, a chromatic difference of magnification correction unit (R) 1015, and a chromatic difference of magnification correction unit (B) 1016.

The operation of the image recovery processing unit 111" will be described with reference to a flowchart shown in FIG. 16.

In step S301, the chromatic difference of magnification correction unit (R) 1015 and the chromatic difference of magnification correction unit (B) 1016 correct the chromatic difference of magnifications of R and B components, respectively.

As shown in FIGS. 4C and 4D, input R and B components have values at only limited pixels. By shifting pixel positions by interpolation processing using only pixels having values, however, it is possible to correct the chromatic difference of magnifications of the RAW image itself.

The pixel interpolation processing (S201) for G components and the pre-recovery color difference information obtaining processing (S202) are as described in the first embodiment.

In step S304, recovery filter application units 1005, 1006, 1017, and 1018 select an image recovery filter appropriate for image capturing conditions. Note that for the image recovery filter used in this embodiment, a translation component for correction of a chromatic difference of magnification has been removed. That is, the image recovery filter includes no chromatic difference of magnification correction component, which thus corrects the spread and asymmetry of the aberrations to sharpen the image but does not correct the translation component of the chromatic difference of magnification. As described above, using such an image recovery filter enables to process the chromatic difference of magnification independently of the image recovery processing. That is, it becomes possible to perform processing by separating correction and sharpening of asymmetrical aberrations for each color component from correction of a color deviation as a translation component of the chromatic difference of magnification.

Furthermore, in step S304, the selected image recovery filter may be corrected, as needed. This corresponds to an operation of correcting an image recovery filter according to the actual captured state in executing the image recovery processing by preparing discrete captured state data in order to decrease the number of data of image recovery filters prepared in advance in a storage unit 108. Furthermore, instead of selecting an image recovery filter, it may be generated according to the captured state based on information about an optical transfer function necessary for generating an image recovery filter.

In step S305, the recovery filter application units 1005, 1006, 1017, and 1018 apply the image recovery filter selected or generated in step S304 to each color component of the captured input image. This enables to correct the asymmetry of a point spread function due to the aberrations of an optical imaging system 101, thereby removing or reducing the blur components of the image.

Figure 17A:
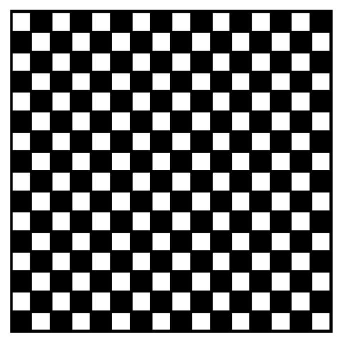
FIGS. 17A to 17E are views for explaining the image recovery processing according to the second embodiment of the present invention.
Figure 17B:
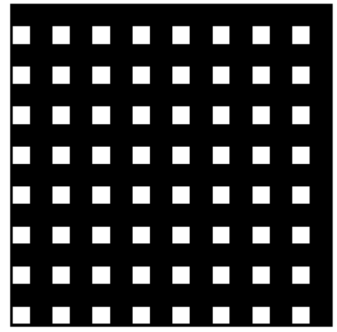
Figure 17C:
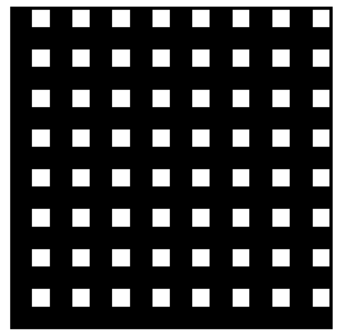
Figure 17D:
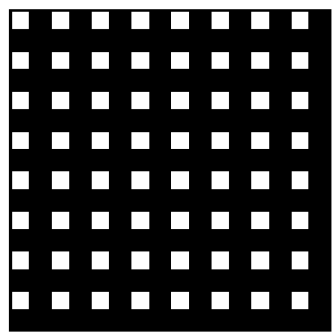
Figure 17E:
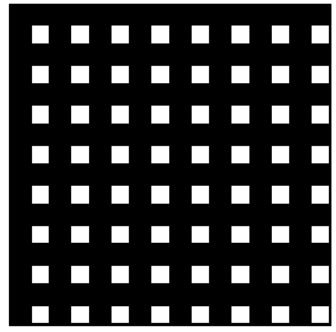

In this embodiment, as shown in FIGS. 17A, 17D, and 17E, a G component of the RAW image is further separated into two G1 and G2 components in a Bayer array, to which the recovery filter application unit (G1) 1017 and recovery filter application unit (G2) 1018 apply the image recovery filter, respectively. More specifically, the signal of a G component output from a pixel horizontally neighboring a pixel which outputs the signal of an R component is set as the signal of a G1 component, and the signal of a G component output from a pixel horizontally neighboring a pixel which outputs the signal of a B component is set as the signal of a G2 component.

That is, R, B, G1, and G2 components shown in FIGS. 17B to 17E are processed as image recovery components, to which the recovery filter application units 1005, 1006, 1017, and 1018 separately apply the image recovery processing (convolution processing).

The meaning of performing processing by further separating the G component into the two G1 and G2 components will be described. Each of FIGS. 18A and 18B is a view showing the spatial frequency characteristics of a pixel arrangement for each color component in an image sensor having a Bayer array primary color filter.

For a predetermined range of (x, y), an array m_G(x, y) is obtained, in which among the pixels of the G components, a pixel (white) capable of detecting light is set with "1" and a pixel (black) incapable of detecting light is set with "0". Similar arrays are also obtained for the R, B, G1, and G2 components, which are represented by m_R(x, y), m_B(x, y), m_G1(*x, y*), and m_G2(*x, y*), respectively. Results obtained by performing Fourier transform for m_G(x, y), m_R(x, y), m_B(x, y), m_G1(*x, y*), and m_G2(*x, y*) correspond to the frequency characteristics shown in FIGS. 18A and 18B.

Figure 18A:
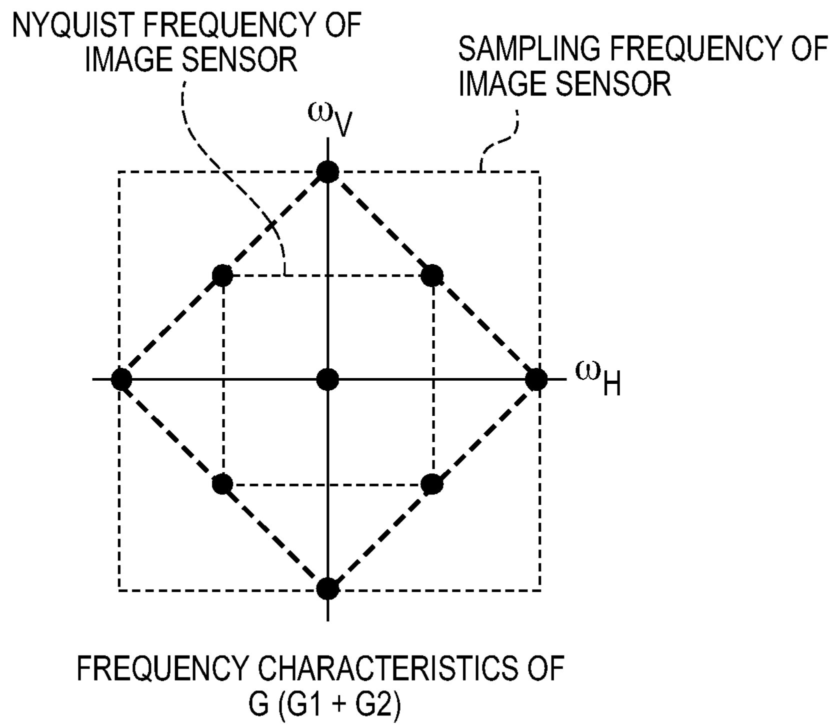
FIGS. 18A and 18B are views for explaining the image recovery processing according to the second embodiment of the present invention.

FIG. 18A shows a comb function in which "1" exists only at positions indicated by "●" and which represents the G component including both the G1 and G2 components, that is, the frequency characteristics shown in FIG. 17A. The frequency characteristics of the G component shown in FIG. 18A is different from that shown in FIG. 18B which shows the frequency characteristics of the R and B components respectively shown in FIGS. 17B and 17C. On the other hand, by separating the G component into the G1 and G2 components, the frequency characteristics as shown in FIG. 18B are obtained like the R and B components.

Figure 18B:
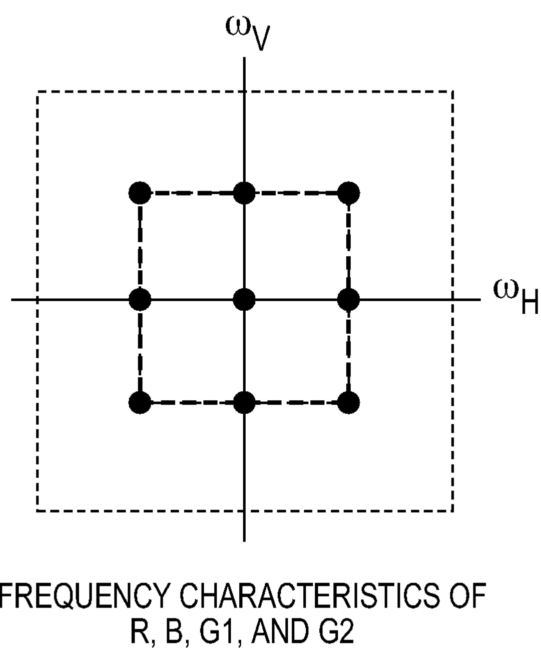

Since the Bayer array primary color filter includes G components twice as many as R or B components, the frequency characteristics of the G component is different from those of the R or B component, as shown in FIGS. 18A and 18B. If, therefore, an image recovery filter is applied to three color components, that is, R, G, and B components without dividing the G component into the G1 and G2 components, only the G component is recovered to a high-frequency band. If only the G component of the R, G, and B components is recovered to a high-frequency band, a false color which does not originally exist may occur in an image region including a high-frequency component. This is caused by a change in relationship between the frequency characteristics of the R, G, and B components in the high-frequency band of the image before and after the image recovery processing.

As described above, if the frequency characteristics of components to undergo image recovery processing are different, the image recovery processing causes a false color to occur. This false color is different from that occurring due to pixel interpolation for a Bayer array image, and occurs due to a change in pixel value itself obtained by the image sensor. A method of suppressing the occurrence of a false color due to pixel interpolation, therefore, cannot suppress a false color which occurs due to image recovery processing.

By separating the G component into the G1 and G2 components, the pixel arrangements of the four R, G1, G2, and B image recovery components present the same spatial frequency characteristics, thereby enabling to suppress the occurrence of a false color due to the image recovery processing. Note that even if the G component is not separated into the G1 and G2 components, the frequency band of the G component to be corrected can coincide with that of the R or B component depending on a method of creating an image recovery filter to be applied to the G component. In this case, however, the frequency band to be recovered is equal to that when the G component is separated into the G1 and G2 components.

Succeeding processing is the same as that in steps S205 to S209 in the first embodiment. After applying the image recovery filter by separating the G component into the G1 and G2 components in step S305, the succeeding processing is executed by assuming one G component.

The arrangement of the image recovery processing unit 111" and the image recovery processing according to this embodiment have been described. An example of the operation and effect of correction of a chromatic difference of magnification in step S301 and application of the image recovery filter without a chromatic difference of magnification correction component in step S305 in this embodiment will be described with reference to FIGS. 19A and 19B.

FIGS. 19A and 19B are schematic views each showing an example of pixel values, at and around a point light source in the horizontal direction, in an input shown in FIG. 8 that has been obtained by capturing a field of view, around the perimeter of which the point light source exists. In each of FIGS. 19A and 19B, an upper portion shows the pixel values of the R and G components, and a lower portion shows a difference between the values of the R and G components shown in the upper portion, that is, a color difference.

FIG. 19A is a view for explaining the operation and effect of use of the image recovery filter without a chromatic difference of magnification correction component in an out-of-focus state. 19A-a of FIG. 19A shows a state in which neither chromatic difference of magnification correction processing nor image recovery processing using the image recovery filter without a chromatic difference of magnification correction component has been performed, and each aberration remains in the image. Blur has occurred for both the G and R components, color fringing has also occurred due to the chromatic difference of magnification, and therefore, a color difference has occurred at each of the left and right edges. The degrees of blur of the G and R components, however, are equal to each other.

19A-b of FIG. 19A shows a case in which only the chromatic difference of magnification correction processing has been applied. Although blur has occurred for the G and R components, a color deviation has been cancelled by the chromatic difference of magnification correction processing. Since the degrees of blur of the G and R components are originally equal to each other, a color difference is 0 for the whole region.

19A-c of FIG. 19A shows a case in which the image recovery processing using the image recovery filter without a chromatic difference of magnification correction component has been applied in addition to the chromatic difference of magnification correction processing. Since this shows an out-of-focus state, blur has reduced but coloring has occurred because the state of aberrations in the actual captured state is different from that of aberrations to be processed by the image recovery filter. This coloring is to be suppressed in this embodiment. As described above, in this embodiment, whether pixel value adjustment processing for suppressing coloring (correction of pixel values) is necessary is determined based on a difference between the color difference shown in b corresponding to the state in which the chromatic difference of magnification has been corrected and that shown in c corresponding to the state in which the image recovery filter has been applied.

Since the color difference in the state shown in 19A-b of FIG. 19A is 0 for the whole region, the color difference is determined to have increased by applying the image recovery filter, and thus it is determined that pixel value adjustment for suppressing coloring is necessary. 19A-d of FIG. 19A shows a state after execution of the pixel value adjustment processing for suppressing coloring, in which the coloring that has occurred due to the image recovery processing has been appropriately suppressed and the color difference is 0 for the whole region similarly to the state shown in b.

On the other hand, FIG. 19B shows a case in which an image recovery filter with a chromatic difference of magnification correction component is used in an out-of-focus state. 19B-a of FIG. 19B is the same as 19A-a of FIG. 19A, and shows a state in which neither chromatic difference of magnification correction processing nor image recovery processing using the image recovery filter has been executed.

19B-b of FIG. 19B shows a state in which in the above state, the image recovery filter with a chromatic difference of magnification correction component has been applied to execute the chromatic difference of magnification correction processing and the image recovery processing. Although a color deviation has been removed and blur has reduced, coloring has occurred by applying the image recovery filter. This state is the same as that shown in 19A-c of FIG. 19A.

If the image recovery filter with a chromatic difference of magnification correction component is used, whether pixel value correction for suppressing coloring is necessary is determined based on a difference between a color difference in 19B-a of FIG. 19B before application of the image recovery filter and that in 19B-b of FIG. 19B after application of the image recovery filter. In this case, since the sign of the color difference has been inverted in part of the left edge, it is determined that pixel value correction for suppressing coloring is necessary. Since, however, the color difference has not increased and the sign of the color difference has not been inverted at the right edge, it is determined that pixel value correction is not necessary.

19B-c of FIG. 19B shows a state in which the pixel value adjustment processing for suppressing coloring has been executed, in which coloring at the left edge has been suppressed but coloring at the right edge has not been suppressed and thus remains.

As described above, in this embodiment, in addition to the effects of the first embodiment, it is possible to suppress coloring with high accuracy by executing chromatic difference of magnification correction processing before image recovery processing, and applying an image recovery filter without a chromatic difference of magnification correction component to execute the image recovery processing.

Furthermore, by separating a G component into G1 and G2 components to apply the image recovery processing, the frequency characteristics of the respective components of a RAW image are equal to each other, thereby enabling to further suppress coloring due to the image recovery processing.

Note that in this embodiment, the image recovery processing unit 111" including the arrangement for separating a reference G color component into G1 and G2 components, and a combination of chromatic difference of magnification correction and an image recovery filter without a chromatic difference of magnification correction component has been described. However, in other embodiments, any one or a combination of the constituent elements may be used, thereby obtaining individual effects.

In a further embodiment, an arrangement including pixel thinning units can be used, in an analogous manner to the modification of the first embodiment described with reference to FIG. 11.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

Note that each of functional blocks such as a "unit" and a "section" in the drawings can be realized by hardware (i.e., discrete circuits, an ASIC, programmable logic devices, etc.), software (i.e., a combination of software and a processor such as a CPU and a MPU that executes the software), or a combination thereof. Also note that a plurality of the functional blocks can be realized by a single hardware entity. Also note that at least one of a plurality of processes that are described as being performed by a CPU can be performed by another proprietary or nonproprietary hardware.

While the present invention has been described with reference to embodiments, it is to be understood that the invention is not limited to the disclosed embodiments.

This application claims the benefit of Japanese Patent Application No. 2011-189326, filed on Aug. 31, 2011, which is hereby incorporated by reference herein its entirety.

What is claimed is:

1. An image processing apparatus for correcting degradation in image quality, due to aberrations of an optical imaging system of an image capture apparatus, in an image which has been captured by the image capture apparatus and in which each pixel has one of predetermined color components, said image processing apparatus comprising one or more processors that function as:

a first pixel interpolation unit configured to execute pixel interpolation processing for a predetermined reference color component of the image, the predetermined reference color component being one of the predetermined color components;

a first obtaining unit configured to obtain, for each pixel that corresponds to any other color component than the reference color component of the image, a first color difference using a value of the corresponding color component and a value of the reference color component for the pixel that is obtained by the pixel interpolation processing by said first pixel interpolation unit;

an image recovery processing unit configured to apply an image recovery filter based on a point spread function of the optical imaging system to each color component of the image;

a second pixel interpolation unit configured to execute pixel interpolation processing for the reference color component of the image to which the image recovery filter has been applied;

a second obtaining unit configured to obtain, for each pixel that corresponds to any other color component than the reference color component of the image to which the image recovery filter has been applied, a second color difference using a value of the corresponding color component and a value of the reference color component for the pixel that is obtained by the pixel interpolation processing by said second pixel interpolation unit; and a correction unit configured to correct the image to which the image recovery filter has been applied, according to a difference between the first color difference and the second color difference.

2. The image processing apparatus according to claim 1, wherein said correction unit is further configured to determine, for each pixel corresponding to any other color component than the reference color component of the image which has been applied with the image recovery filter and according to the difference between the first color difference and the second color difference, whether it is necessary to correct a value of a color component other than the reference color component.

3. The image processing apparatus according to claim 1, further comprising a chromatic difference of magnification correction unit configured to correct a chromatic difference of magnification of the optical imaging system for each color component other than the reference color component of the image, wherein said first obtaining unit obtains the first color difference for each color component for which the chromatic difference of magnification has been corrected, and said image recovery processing unit applies an image recovery filter which does not be interpolated, the pixel interpolation processing using an interpolation method determined based on values of color components, other than the specific color component, taken from surrounding pixels.

4. The image processing apparatus according to claim 1, wherein the image is captured by an image sensor having a Bayer array primary color filter, and the reference color component is a G component.

5. The image processing apparatus according to claim 4, wherein said image recovery processing unit is further configured to separate the G component into a G1 component and a G2 component, and to apply the image recovery filter to each of the G1 component and the G2 component.

6. The image processing apparatus according to claim 1, further comprising a third pixel interpolation unit configured to output color components other than the reference color component which have been output by said correction unit, and the reference color component to which the image recovery filter has been applied, by performing pixel interpolation.

7. The image processing apparatus according to claim 6, wherein at least one of said first pixel interpolation unit, said second pixel interpolation unit, and said third pixel interpolation unit is configured to execute, for a value of a specific color component of a pixel to a first pixel interpolation unit configured to execute pixel interpolation processing for a predetermined reference color component of the image, the predetermined reference color component being one of the predetermined color components;

a first obtaining unit configured to obtain, for each pixel that corresponds to any other color component than the reference color component of the image, a first color difference using a value of the corresponding color component and a value of the reference color component for the pixel that is obtained by the pixel interpolation processing by said first pixel interpolation unit;

an image recovery processing unit configured to apply an image recovery filter based on a point spread function of the optical imaging system to each color component of the image;

a second pixel interpolation unit configured to execute pixel interpolation processing for the reference color component of the image to which the image recovery filter has been applied;

a second obtaining unit configured to obtain, for each pixel that corresponds to any other color component than the reference color component of the image to which the image recovery filter has been applied, a second color difference using a pixel value of the corresponding color component and a value of the reference color component for the pixel that is obtained by the pixel interpolation processing by said second pixel interpolation unit; and a correction unit configured to correct the image to which the image recovery filter has been applied, according to a difference between the first color difference and the second color difference.

8. The image processing apparatus according to claim 1, wherein the image recovery filter is generated based on a point spread function of the optical imaging system, for which a difference between color components of the point spread function is decreased by translating a point spread function of a given color component to a position of a point spread function of another color component.

9. The image processing apparatus according to claim 1, wherein the image recovery filter is generated based on an optical transfer function of the optical imaging system, for which a linear component has been removed from a frequency characteristic of a phase of the optical transfer function.

10. An image capture apparatus comprising:

an optical imaging system for imaging an optical image of an object;

an image sensor for capturing the optical image; and an image processing apparatus for correcting degradation in image quality, due to aberrations of an optical imaging system of an image capture apparatus, in an image which has been captured by the image capture apparatus and in which each pixel has one of predetermined color components, said image processing apparatus comprising one or more processors that function as:

correct a chromatic difference of magnification.

11. An image processing method of correcting for degradation in image quality, due to aberrations of an optical imaging system of an image capture apparatus, in an image which has been captured by the image capture apparatus and in which each pixel has one of predetermined color components, said method comprising:

a first pixel interpolation step of executing pixel interpolation processing for a predetermined reference color component of the image, the predetermined reference color component being one of the predetermined color components;

a first obtaining step of obtaining, for each pixel that corresponds to any other color component than the reference color component of the image, a first color difference using a value of the corresponding color component and a value of the reference color component for the pixel that is obtained in the first pixel interpolation step;

an image recovery processing step of applying an image recovery filter based on a point spread function of the optical imaging system to each color component of the image;

a second pixel interpolation step of executing pixel interpolation processing for the reference color component of the image to which the image recovery filter has been applied;

a second obtaining step of obtaining, for each pixel that corresponds to any other color component than the reference color component of the image to which the image recovery filter has been applied, a second color difference using a value of the corresponding color component and a value of the reference color component for the pixel that is obtained in the second pixel interpolation step; and a correction step of correcting the image to which the image recovery filter has been applied, according to a difference between the first color difference the second color difference.

12. A non-transitory computer-readable recording medium recording a program for causing a computer to perform an image processing method of correcting for degradation in image quality, due to aberrations of an optical imaging system of an image capture apparatus, in an image which has been captured by the image capture apparatus and in which each pixel has one of predetermined color components, said method comprising:

a first pixel interpolation step of executing pixel interpolation processing for a predetermined reference color component of the image, the predetermined reference color component being one of the predetermined color components;

a first obtaining step of obtaining, for each pixel that corresponds to any other color component than the reference color component of the image, a first color difference using a value of the corresponding color component and a value of the reference color component for the pixel that is obtained in the first pixel interpolation step;

an image recovery processing step of applying an image recovery filter based on a point spread function of the optical imaging system to each color component of the image;

a second pixel interpolation step of executing pixel interpolation processing for the reference color component of the image to which the image recovery filter has been applied;

a second obtaining step of obtaining, for each pixel that corresponds to any other color component than the reference color component of the image to which the image recovery filter has been applied, a second color difference using a value of the corresponding color component and a value of the reference color component for the pixel that is obtained in the second pixel interpolation step; and a correction step of correcting the image to which the image recovery filter has been applied, according to a difference between the first color difference the second color difference.

* * * * *